United States Patent
Du et al.

(10) Patent No.: US 11,447,150 B2
(45) Date of Patent: Sep. 20, 2022

(54) COMFORT-BASED SELF-DRIVING PLANNING METHOD

(71) Applicant: Yuchuan Du, Shanghai (CN)

(72) Inventors: Yuchuan Du, Shanghai (CN); Yishun Li, Shanghai (CN); Chenglong Liu, Shanghai (CN); Lijun Sun, Shanghai (CN)

(73) Assignee: Yuchuan Du, Shanghai (CN)

( * ) Notice: Subject to any disclaimer, the term of this patent is extended or adjusted under 35 U.S.C. 154(b) by 388 days.

(21) Appl. No.: 16/474,696

(22) PCT Filed: Dec. 30, 2017

(86) PCT No.: PCT/IB2017/058538
§ 371 (c)(1),
(2) Date: Jun. 28, 2019

(87) PCT Pub. No.: WO2018/122808
PCT Pub. Date: Jul. 5, 2018

(65) Prior Publication Data
US 2020/0406925 A1 Dec. 31, 2020

Related U.S. Application Data

(63) Continuation of application No. PCT/IB2016/058106, filed on Dec. 30, 2016.

(51) Int. Cl.
*B60W 50/00* (2006.01)
*B60W 30/18* (2012.01)
(Continued)

(52) U.S. Cl.
CPC ...... *B60W 60/0013* (2020.02); *B60W 30/025* (2013.01); *B60W 30/143* (2013.01);
(Continued)

(58) Field of Classification Search
CPC .......... B60W 60/0013; B60W 30/025; B60W 40/06; B60W 30/143; B60W 2552/35; B60W 40/04; B60T 2210/14
See application file for complete search history.

(56) References Cited

U.S. PATENT DOCUMENTS

| | | | |
|---|---|---|---|
| 2005/0216162 A1* | 9/2005 | Suzuki | B60W 10/06 701/70 |
| 2008/0039280 A1 | 2/2008 | Petzold et al. | |

(Continued)

FOREIGN PATENT DOCUMENTS

| | | |
|---|---|---|
| CN | 104369703 A | 2/2015 |
| CN | 105172791 A | 12/2015 |

(Continued)

OTHER PUBLICATIONS

Zhang, Investigating the Relationship Between Pavement Roughness and Heart Rate Variability by Road Driving Test, 2011, Beijing Natural Science Foundation, pp. 1-13 (Year: 2011).*

(Continued)

*Primary Examiner* — Angela Y Ortiz
*Assistant Examiner* — Michael T Silva

(57) ABSTRACT

A comfort-based self-driving planning method is provided, including the steps of: a) establishing a relationship model of vibration road surface quality and driving comfort on the basis of a vehicle type; b) obtaining road ahead condition parameters, including abnormal condition information, road flatness and road surface anti-slide performance; c) obtaining the road ahead condition parameters, and adjusting a vehicle expected driving trajectory; d) respectively designing vehicle acceleration, deceleration and constant speed processes, and generating a speed change curve; and e) optimizing the speed change curve. Based upon changeable road surface quality and vehicle vibration action mechanism analysis and image-based road surface anti-slide coefficient (Continued)

evaluation technology, a GIS and vehicle-road communication technology are used to acquire road condition parameters, and vehicle acceleration, deceleration and constant speed processes are respectively designed on the basis of changes in the parameters.

14 Claims, 9 Drawing Sheets

(51) Int. Cl.
| | |
|---|---|
| *B60W 50/08* | (2020.01) |
| *G05B 13/02* | (2006.01) |
| *B60W 40/06* | (2012.01) |
| *B60W 40/068* | (2012.01) |
| *B60W 30/00* | (2006.01) |
| *G06K 9/00* | (2022.01) |
| *G06T 7/55* | (2017.01) |
| *B60W 30/14* | (2006.01) |
| *B60W 60/00* | (2020.01) |
| *H04W 4/44* | (2018.01) |
| *H04W 4/80* | (2018.01) |
| *G06F 16/29* | (2019.01) |
| *B60W 30/02* | (2012.01) |
| *H04W 4/18* | (2009.01) |
| *G06V 20/56* | (2022.01) |
| *G06V 10/75* | (2022.01) |

(52) U.S. Cl.
CPC ............ *B60W 40/06* (2013.01); *G06F 16/29* (2019.01); *G06V 10/758* (2022.01); *G06V 20/588* (2022.01); *H04W 4/185* (2013.01); *H04W 4/44* (2018.02); *H04W 4/80* (2018.02); *B60W 2520/105* (2013.01); *B60W 2552/35* (2020.02); *B60W 2556/45* (2020.02)

(56) References Cited

U.S. PATENT DOCUMENTS

| | | | | |
|---|---|---|---|---|
| 2012/0053805 | A1* | 3/2012 | Dantu | B60W 40/09 |
| | | | | 701/70 |
| 2012/0197587 | A1* | 8/2012 | Luk | B60W 40/09 |
| | | | | 702/179 |
| 2015/0166072 | A1* | 6/2015 | Powers | E01F 9/40 |
| | | | | 701/1 |
| 2015/0203116 | A1* | 7/2015 | Fairgrieve | B60W 10/11 |
| | | | | 701/93 |
| 2016/0221575 | A1* | 8/2016 | Posch | B60W 30/14 |
| 2016/0259814 | A1* | 9/2016 | Mizoguchi | G06F 16/29 |
| 2018/0022361 | A1* | 1/2018 | Rao | B60R 16/037 |
| | | | | 701/23 |
| 2018/0141561 | A1* | 5/2018 | Fritz | G06V 20/588 |

FOREIGN PATENT DOCUMENTS

| | | | |
|---|---|---|---|
| CN | 1057140793 | 7/2016 | |
| CN | 107525679 A | * 12/2017 | |
| JP | 2006226178 | 8/2006 | |
| WO | WO-2014027069 A1 | * 2/2014 | ............ B60T 8/175 |

OTHER PUBLICATIONS

Chen, Road Condition Monitoring Using On-board Three-axis Accelerometer and GPS Sensor, Feb. 27, 2012, Shenzhen Institutes of Advanced Technology, Chinese Academy of Sciences, pp. 1032-1037 (Year: 2011).*

* cited by examiner

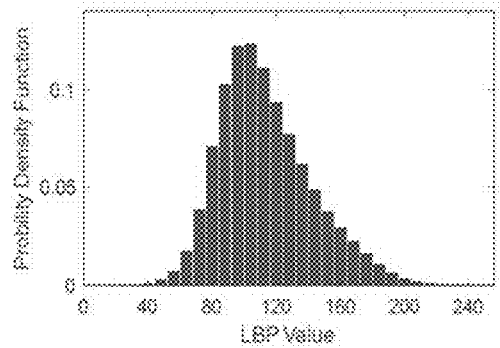
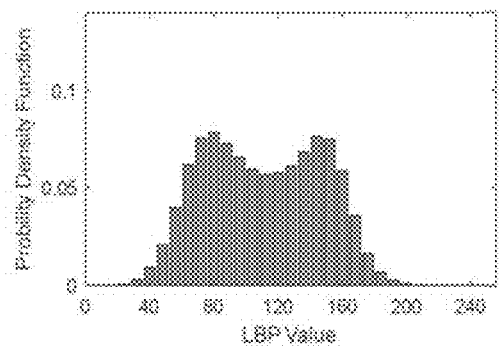
Figure8(a)  Figure8(b)
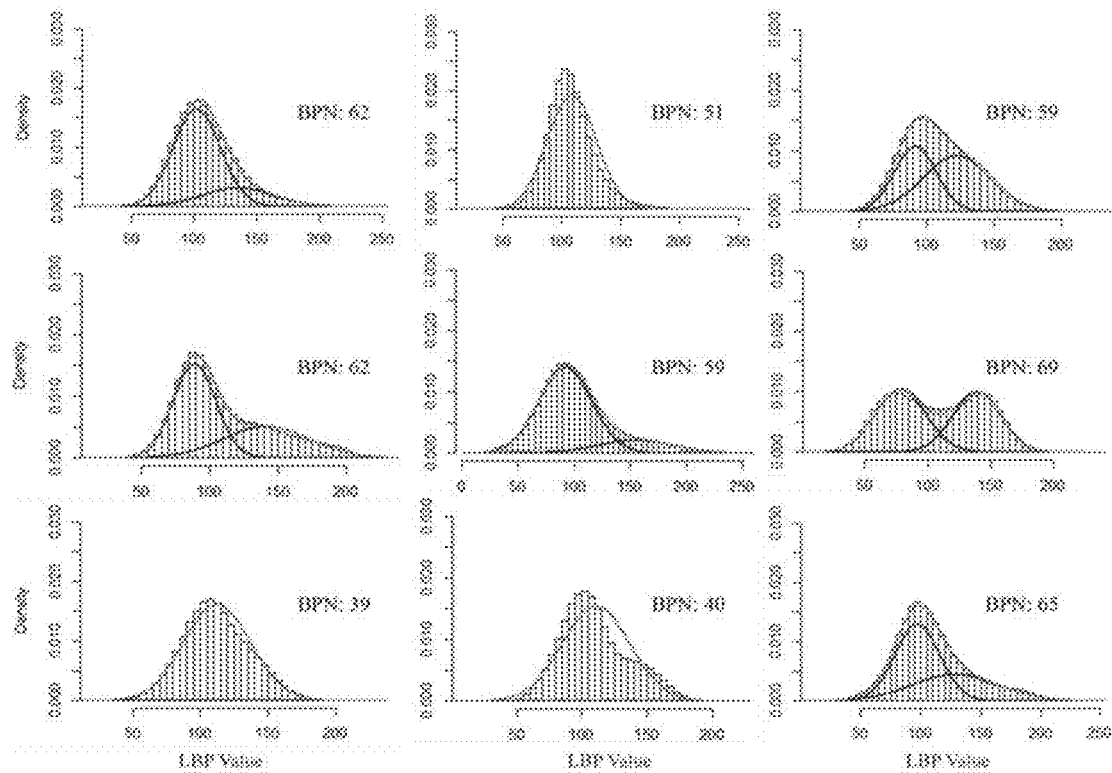
Figure9

COMFORT-BASED SELF-DRIVING PLANNING METHOD

CROSS-REFERENCE TO RELATED APPLICATIONS

The present application claims priority to the International Application No. PCT/IB2016/058106, filed with the International Bureau (IB) on Dec. 30, 2016, and entitled "COMFORT-BASED SELF-DRIVING PLANNING METHOD", which is incorporated herein by reference in its entirely.

TECHNICAL FIELD OF THE INVENTION

The invention belongs to the field of automatic driving technology and automatic speed control technology and relates to vehicle speed control method relating to ensuring passenger comfort affected by running vibration.

BACKGROUND OF THE INVENTION

In the 21st century, with the continuous expansion of the highway and automobile industries, automobiles have become one of the necessary means of transportation for people, which bring great convenience to the daily production and life of human beings. However, excessive use of automobiles also brings much problems such as environmental pollution, traffic congestion, and traffic accidents. To alleviate this problem, automated vehicles are gradually becoming an important direction for the development of automobiles in the future. Automated vehicle combines functions of detection, identification, judgment, decision, optimization, optimization, execution, feedback and correction. It can learn, summarize, improve skills. And it is a smart car with top scientific and technological achievements, which integrates microcomputer, micro-motor, green power and new structural materials. It fundamentally changes the traditional "people-vehicle-road" closed-loop control method, and removes the uncontrollable driver from the closed-loop system, improving the efficiency and safety of the transportation system. Automated vehicles are especially suitable for tourism, emergency rescue, long-distance high-speed passenger and cargo transportation, military use because of its advantage of reliable, safe, convenient and efficient. The application of automated vehicles in the field of transportation fundamentally changes the control mode of traditional cars, which can greatly improve the efficiency and safety of the transportation system.

However, the traditional autonomous driving strategy mostly uses multiple sensors to realize vehicles collision avoidance and lane maintenance, ignoring the impact of road conditions such as uneven road surface on passenger driving comfort. The traditional speed adjustment method can effectively ensure the safety and efficiency of driving, but it lacks consideration for the driving comfort when it drives on bumpy road. According to The Motley Fool, one of Google's main obstacles for promoting autonomous driving is the difficulty of ensuring comfort on bad roads, such as roads with much potholes. We all know that the Google has made complex preparations on specific routes before driving on the road, such as extensive and elaborate mapping of lanes. Much of the data collected from cars with various sensors need be confirmed refined by computer or artificial on "meter" levels. However, these information does not tell whether the road ahead will be smooth or not. More than 43 million people are now 65 or older, and that number is growing by 10,000 a day in America. In addition, 79% of the elderly live in suburbs and rural areas in the United States, and cars are indispensable for travel needs such as shopping, medical treatment and visiting relatives and friends. Google has set its sights on elderly customers, and the need for comfort in an ageing society will be important as automated vehicles are mature in technology.

In the following scene, the automated vehicle drives on a road with poor quality, and there are no other social vehicles and obstacles around. Since there is no safety hazard, automated vehicles will drive at the maximum speed limit, which is bound to cause a poor driving comfort. Therefore, the invention proposes an automatic driving speed control strategy based on comfort. This driving strategy is based on the safe driving strategy, which ensures the safe speed while considering the influence of vehicle-road action, and then proposes a speed control strategy that is more consistent with the driving law.

On the other hand, when the road surface has obvious slab staggering, such as bridge head jump or deceleration zone. These obstacles can be automatically identified by sensors of vehicle, but due to the limited detection distance of the equipment, the vehicle often lacks sufficient deceleration distance, resulting in sudden deceleration or sudden braking. It seriously affects the driving comfort. In the autonomous driving environment, vehicles can interact with road facilities or other vehicles, so that abnormal problems on the road can be passed to vehicles in advance. And appropriate control strategies can be selected to ensure safe and smooth passage of vehicles.

In the study of driving comfort, driving comfort is mainly controlled by car manufacturer to adjust actively, by detecting the vibration of the vehicle. they adjust the angle of the seat and the direction for passengers to alleviate the impact of turbulence. However, these slight adjustments can only alleviate discomfort within a certain scope. When the vibration is more noticeable, drivers still need to take the initiative to slow down to ensure driving comfort. The evaluation methods of driving comfort can be divided into subjective evaluation and objective evaluation. The subjective evaluation method is based on the subjective feeling of the passengers and takes human factors into account. The objective evaluation method is to collect, record and process the random vibration data with the aid of instruments and equipment, and to make objective evaluation by obtaining the relevant analysis values and the corresponding restriction indexes. In recent years, great progress has been made in the study of smoothness evaluation by using subjective and objective evaluation methods comprehensively.

The roughness of road surface is the medium and micro feature of road surface, which is different from big obstacles. It is not easy to be identified by image analysis or radar technology. Therefore, it is necessary to adjust the driving speed of the vehicle through the communication between road and vehicles so as to guarantee the driving comfort. Road roughness refers to the deviation of the longitudinal elevation value of the road surface. Pavement evenness is an important technical index to evaluate pavement quality. It mainly reflects the smoothness of profile curve of pavement profile, which is related to the safety, comfort and impact force of the road. The uneven road surface will increase the driving resistance and cause additional vibration of the vehicle. This kind of vibration will cause bump, affect the speed and safety of the journey, and affect the smooth driving comfort. When the profile curve of the longitudinal section of the road surface is relatively smooth, it means the road surface is relatively flat, or the roughness is relatively good. In the other hand, it means the roughness is relatively poor.

In the other hand, the friction performance of the road surface is an important factor affecting the driving safety of the vehicle and has a significant impact on the parking and steering performance of the vehicle. The longer the braking distance of a road vehicle with poor slip resistance, the more the frictional effect is more obvious as the driving speed is increased, and thus a serious accident risk is generated. The smooth road surface makes the wheels lack sufficient adhesion. When the car is driving in rain or snow or when braking or turning, the wheels are prone to idling or slipping, which is very likely to cause traffic accidents. Therefore, the road surface should be flat, dense, rough, wear-resistant, with a large friction coefficient and strong anti-sliding ability. The road has strong anti-sliding ability, which can shorten the braking distance of the car and reduce the frequency of traffic accidents. Although the conventional automatic vehicle detecting device can realize the recognition of road obstacles, road marking lines and typical traffic facilities through radar, images, etc., it is impossible to detect the road performance, so it is difficult to determine the appropriate driving speed, thereby reducing driving safety.

The friction performance of the road surface is mainly reflected in the friction between the tire and the road surface. It mainly includes two aspects: adhesion and hysteresis force. As shown in FIG. 1, the former depends on the shear strength and area of the contact surface, and the latter depends on the internal damping loss of rubber of the tire. On a flat, dry road surface, the anti-slip property is mainly controlled by adhesion. The adhesion comes from the bonding force with the tires and road surface molecules, the rubber shear under the tire surface, and is mainly provided by the fine aggregate part in the road surface. On rough, wet roads, the slip resistance is mainly controlled by the hysteresis force. When the road surface is wet, the adhesion is significantly reduced. On the rough road surface, the tire is continuously subjected to compression and relaxation deformation, mainly generated by coarse aggregate.

Because the texture features of the pavement can characterize its friction performance, this invention uses the machine vision method to perform data mining analysis based on the acquired images, predict the friction performance of the road surface and feed the results back to the autonomous vehicle to improve driving safely the vehicle.

The modern control strategies for driving speed mainly include adaptive control, variable structure control, robust control and predictive control. Adaptive control is to determine the current actual working state of the controlled object, optimize performance criteria and generate adaptive control rules in the system operation by continuously collecting control process information, so as to adjust the structure or parameters of the controller in real time and make the system work automatically at the optimal or sub-optimal running state all the time. Current adaptive strategies include model reference adaptive control, parameter identification self-correction control and nonlinear adaptive control. These methods can guarantee the vehicle to cope with the complex traffic environment and automatically adjust the vehicle state to ensure safety. The variable structure control is that when the system state passes through different continuous surfaces in the state space, the structure of the feedback controller will change according to a certain rule, so that the control system has a certain adaptability to the internal parameter changes of the controlled object and external environment disturbances and other factors, so as to ensure that the system performance reaches the desired standard. Robust control is a careful and reasonable compromise control method between control performance and robustness when solving the deterministic object control problem. The robust controller can keep the system stable and guarantee the quality of dynamic performance when the parameters are uncertain in a certain range and the unmodeled dynamics exist in a certain limit. Predictive control is an accurate mathematical model which does not require the controlled object. It uses the digital computer to implement online rolling optimization calculation, so as to achieve good comprehensive control effect.

These four control modes are widely used in autonomous driving and are also the main basis for generating speed curves. This invention, based on the existing control, adds the comfort control model, integrating the input of external environment information, and improves the speed control strategy to ensure that the change characteristics meet the requirements of comfort.

Because when vehicles running in automatic mode, drivers are not needed to perform operations. Vehicles usually depends on the multiple data sources as input to perform autonomous driving, such as vehicle detection, traffic lanes, around obstacles, data from the navigation system and so on. These parameters are derived from different environment facilities, for example on-board equipment, such as GPS equipment, radar, sensor and infrared devices, etc. Another kind of information is derived from the car body database, such as road map data, data signal cycle, etc. For the latter, the update of the database has become one of the important research issues. Only by updating the traffic information in the database according to the external environment in real time, the vehicle can operate stably in the established trajectory.

At present, the update of vehicle information database mainly relies on vehicle-road communication technology. Vehicles are both the sender of road environment collection and the receiver of traffic information. For example, if a traffic accident is found during the driving process of the current vehicle, this information can be transmitted to the roadside equipment and then to the next vehicle. And this can improve the operation efficiency of the following vehicles and avoid traffic accidents.

The advanced geographic information system (GIS) provides a good platform for autonomous driving technology. The traffic management department can assign the measured road distress, road condition and abnormal traffic information to GIS layers through GPS tags. Geographic information system (GIS) is a computer-based tool that can analyze and process spatial information. GIS technology integrates the unique visualization and geographic analysis functions of maps with general database operations such as query and statistical analysis. With the continuous development of GIS technology, it can combine collected road information with map. Through the vehicle road communication technology, the information can be passed to automated vehicle, and in turn, guide the vehicle. This method can solve the limited distance of vehicle detection system for automated vehicle. And it can provide a more advanced data for driving speed decision making in the next section. It is a technical system that collects, stores, manages, computes, analyses, displays and describes the geographic distribution data in the whole or part of the earth's surface (including the atmosphere) space, supported by computer hardware and software systems. GIS is usually used in combination with GPS. For the large-scale and outdoor patrol, the patrol staff often holds the GPS patrol device, receive the GPS satellite positioning information (time, latitude and longitude) in real time, and automatically or manually send the positioning information to the wireless communication preserver at a preset time interval. After receiving the positioning information, the wireless communication preserver transmits the data to the management system platform. The system software can dynamically display and replay the patrol track by adopting GIS electronic map technology. The detailed information of the patrol point can be obtained by GIS analysis.

Prior Art 1

WO2016126317(1) shows multiple vehicle control methods for an automated vehicle under various conditions, including braking, steering, and etc.

It analyzes the various conditions that can be encountered during the driving process, especially in urban roads, including speed limit signs, road maintenance, intersection signals and other road conditions; vehicles cover emergency vehicles, maintenance vehicles and other types. Driving behavior is considered as well.

However, it does not give a specific feasible speed control strategy, namely how to accelerate and decelerate, how to determine the driving speed. Moreover, it does not consider the driving comfort while designing the control strategy.

Prior Art 2

CN104391504A, based on the analysis of driver behavior habits, combines the regional driving habit model and road condition model to generate the current vehicle's automatic driving control strategy, so that the automatic driving control strategy is adapted to the vehicle and its driving environment.

The vehicle driving habits model includes: the vehicle speed index, the vehicle brake index, the vehicle distance index and the vehicle overtaking index; the regional driving habit model includes: regional speed index, regional brake index, regional distance index and regional overtaking index; road condition model includes: vehicle density index, average speed index, road curve index, pavement index, accident rate index and intersection index. Environmental information includes: surrounding vehicle information, pedestrian information, lane line information, traffic sign information, and traffic signal information; active driving information includes: accelerator pedal opening, acceleration, deceleration, steering the wheel angle or vehicle yaw angle.

However, this model does not involve the root cause of passenger discomfort: the quality of the road, so it is not possible to actively and specifically improve the driving comfort.

Prior Art 3

CN104583039A proposes a method and system for controlling the speed of a vehicle that can travel on a variety of different terrains and conditions, and the purpose of doing so is to improve the driving comfort in the vehicle. The patent analyzes the speed control strategies of the existing cruise control system: The tradition system keeps the speed as close as possible to the initial speed, which is set by drivers or passengers, but ignores the driving environment and the occupancy of the vehicle (such as the number and the position of passengers). Given such condition, maintaining the initial speed may significantly affect the comfort and the stability of the vehicle. This patent proposes a speed control system that limits one or more of the above disadvantages to a minimum or elimination.

The system takes the terrain, the movement of the vehicle body, and the occupancy of the vehicle into account. In particular, considering the comfort level of all passengers in the vehicle, it is more user-friendly than considering a single position or only considering the vibration of the vehicle. However, the level of comfort is relatively vague and lacks scientific calculation methods. As a result, the speed of specific maintenance is difficult to calculate and conducted.

Prior Art 4

CN105739534A proposes a vehicle-based multi-vehicle cooperative driving method and devices based on the Internet of Vehicles. The specific implementation manner of the method includes: acquiring current driving data and road condition information of the vehicle in real time; receiving a plurality of other automated vehicles within a predetermined distance to transmit the shared driving data and road condition information; Based on current driving data and road condition information of a plurality of automated vehicles, the driving decision plan is generated. The driving decision plan includes driving priority and driving route; and the driving instruction of the vehicle is generated according to the driving decision plan. The method enables each automated vehicle to plan driving decisions according to the current driving data and road condition information of the vehicle and other surrounding unmanned vehicles in real time, thereby improving the public road usage rate and the driving safety level of each automated vehicle.

In this system, multiple vehicles in the same road are considered for coordinated control. However, the scope of multi-vehicle coordination is relatively small, and it is difficult to increase the coordination of the entire network, which limits the application of this method.

Prior Art 5

CN105679030A proposes an unmanned traffic system based on the existing road network and the central port control of the vehicle, which is composed of three parts: the vehicle remote control device, the road monitoring device and the central control system. The central control system uniformly dispatches all vehicles in the entire road network through the on-board remote-control equipment installed on each vehicle, and the road monitoring equipment assists in the collection and transmission of the data. Global automatic scheduling is progressively performed on the basis of existing vehicles. The system is retrofitted to the existing traffic system. Therefore, compared with the subway, the system has obvious cost performance advantages, and the construction cost is only 1/60 of the subway.

Although this method can implement global optimization control, it ignores an important data source: the vehicle itself. The vehicle is the real user of the road and has the most accurate information on the road. If you can't make good use of the information collected by the vehicle itself, it is difficult to be accurate even if the whole network control is realized.

SUMMARY OF THE INVENTION

The object of this invention is to provide a set of auxiliary comfort-based automated vehicle speed control strategies. The proposed method generates the speed curve by analyzing the mechanism of road surface quality and vehicle vibration, and using GIS and vehicle road communication technology to obtain road conditions. The GIS database are continuously updated by the vibration of the vehicle, which helps to improve the comfort of the following vehicles. The driving path is optimized in combination with the vibration state of the historical vehicle to avoid road distresses, thereby improving the driving comfort of the passengers.

The technical problems to be solved by the present invention mainly include the following eight aspects, namely:

1) Vehicle Road Status Interaction Technology Based on Vehicle Road Communication Technology 2) Vehicle driving comfort prediction model 3) Comfort generation strategy based on road condition information 4) Optimization of comfort speed curve parameters under finite conditions 5) Road vision anti-slip performance detection based on machine vision 6) Design of Early Warning System for Vehicle Abnormal Situation Based on Road Vibration 7) Anomalous traffic state data early warning mechanism for self-driving vehicles 8) GIS road condition information update and rectification technology based on automatic vehicle sensing data The vehicle-to-infrastructure technology is the basis for comfortable driving. The purpose is to transmit the road condition data collected by the road management department and other vehicles to the current vehicle, thereby guiding the vehicle to travel, and reducing the influence of vehicle vibration on the passenger driving experience through speed control.

In view of the above-mentioned problems, the present disclosure provides the following technical solution: a comfort-based self-driving planning method, the method comprising the following steps:

a) establishing a prediction model between vibration type pavement condition and driving comfort, based on type of vehicles, including:
- a1) mounting three-axis acceleration sensors to particular positions of a vehicle with selected model;
- a2) driving the vehicle at different speeds on testing roads, respectively, to acquire data of vibration of three-axis acceleration via the three-axis acceleration sensors;
- a3) calculating integrated weighted root-mean-square acceleration RMSA as a comfort indicator for each testing road based on the data of vibration of three-axis acceleration; and
- a4) establishing a multivariate linear regression based on the comfort indicator, a driving speed and an international roughness index IRI value, wherein the comfort indicator is used as a dependent variable, and the driving speed and the international roughness index IRI value are used as independent variables;

b) obtaining road conditions, including road IRI, road surface anti-sliding performance, and abnormal conditions;

c) guiding the vehicle to travel based on the road conditions;

d) determining a speed control strategy during an acceleration process, a deceleration process and a uniform process, to generate a comfort-based speed curve; and e) optimizing parameters of the comfort-based speed curve to ensure a comfort degree of a user;

wherein the comfort-based speed curve in step d) is obtained by the following method:
- when the differences of the road IRI between the ahead road section and the current position is less than 10%, and there is no abnormal condition, the comfort-based speed curve is of constant speed; and
- when the differences of the road IRI between the ahead road section and the current position is greater than or equal to 10%, no matter there is abnormal condition or not, or when the differences of road IRI between the ahead road section and the current position is less than 10%, and there is abnormal condition, the comfort-based speed curve is of hyperbolic tangent function, which includes two parameters, wherein speed difference value and stability coefficient, the speed difference value is the difference between the current speed and the speed corresponding to a target comfort degree.

In further improvements, the testing roads in step a2) should meet the following conditions:
- a21) the testing roads are straight-line segment of not less than 300 meters long; and
- a22) the road roughness of the testing roads is 1 m/km, 2 m/km, 3 m/km, 4 m/km, 5 m/km, 6 m/km respectively.

In further improvements, method to obtain the road conditions include:
- b1) obtaining the following road condition information: measured road distress, road condition, abnormal traffic information, and road surface anti-sliding performance;
- b2) assigning GPS tags to the road conditions;
- b3) assigning the road condition information to GIS layers through GPS tags;
- b4) passing the road condition information to automated vehicles via vehicle road communication technology;
- b5) detecting vibrations by the automated vehicles using in-car sensors;
- b6) uploading the vibrations to GIS database via the vehicle road communication technology; and
- b7) analyzing the vibrations, updating and correcting the road condition information in the GIS database.

In further improvements, obtaining the road surface anti-sliding performance in b 1) through the following sub-steps:
- b11) obtaining photos of front road by cameras on the automated vehicles;
- b12) converting each photo into a local binary pattern (LBP) matrix form;
- b13) drawing a histogram after calculating LBP values of all the elements in each photo, and calculating the LBP histogram fitting parameters, based on a mixed Gaussian distribution model; and
- b14) obtaining the road surface anti-sliding performance.

In further improvements, the step in b4) includes the following sub-steps:
- b41) arranging wireless transmission facilities along roadside at a first distance of 1 km;
- b42) the wireless transmission facilities including a data storage part and a short-range wireless communication part; wherein the data storage part stores the road condition information with the GPS tags; and
- b43) connecting automatically the wireless communication facilities to the automated vehicles, and passing the road condition information to the automated vehicles, when the automated vehicles travel within a range of wireless network coverage of roadside wireless communication facilities.

In further improvements, step b7 includes two conditions:
- b71) recording a position of a vibration as a temporary data to be confirmed when the vibration beyond expectation is detected, and adding the data to the GIS database when position matching degree is greater than 2.1; and
- b72) recording a position of a vibration as a temporary data to be deleted when the vibration within expectation is not detected, and deleting the data from the GIS database when position matching degree is greater than 2.1.

In further improvements, the differences of road IRI between the ahead road section and the current position is greater than 10%, but there is no abnormal condition, the stability coefficient is calculated as follows:
- e11) calculating maximum acceleration of a driving direction;
- e12) calculating the comfort degree under current speed, based on the prediction model; and e13) calculating the weighted RMSA of the maximum acceleration and the comfort degree, so that the comfort degree is less than a comfort degree threshold; calculating a value range of the stability coefficient; and choosing the maximum of the value range as a value of the stability coefficient.

In further improvements, the differences of IRI between the ahead road section and the current position is less than 10%, but there is abnormal condition, the smooth parameter stability coefficient is calculated as follows:

e21) calculating an acceleration jerk, ensuring the acceleration jerk is within an acceleration jerk threshold; calculating a first value range of a first stability coefficient;

e22) calculating maximum acceleration of a driving direction; establishing a nonlinear optimization equation, based on the prediction model and a second distance between an automated vehicle and a nearest abnormal condition, and calculating a second value range of a second stability coefficient; and e23) comparing the two value ranges of the first and second stability coefficient in e21) and e22), and choosing the maximum of the two value ranges as a value of the stability coefficient.

In further improvements, the differences of IRI between the ahead road section and the current position is greater than 10%, and there is abnormal condition, the smooth parameter stability coefficient is calculated as follows:

e31) calculating maximum acceleration, calculating the comfort degree under a current speed, based on the prediction model, calculating weighted root-mean-square of the maximum acceleration and the comfort degree, so that the comfort degree is less than a comfort degree threshold; calculating a first value range of a first stability coefficient, and taking the maximum of the first value range as a value of the first stability coefficient;

e32) calculating an acceleration jerk, ensuring the acceleration jerk is less than an acceleration jerk threshold; calculating a second value range of a second stability coefficient, and taking the maximum of the second value range as a value of the second stability coefficient;

e33) calculating the maximum acceleration; establishing a nonlinear optimization equation, based on the prediction model and a second distance between an automated vehicle and a nearest abnormal condition; and calculating a third value range of a third stability coefficient, and taking the maximum of the third value range as a value of the third stability coefficient; and e34) choosing the maximum of the first stability coefficient, second stability coefficient, and third stability coefficient in e31), e32), and e33) as a value of the stability coefficient.

(1) The vehicle-to-infrastructure technology mainly relies on the geographic information system (GIS) database and the short-range wireless transmission technology, as shown in FIG. 2. Among them, ① is the power input of the roadside infrastructure, 220V/110V AC voltage can be selected according to the actual system requirements; ② is the network cable input, mainly to realize the connection between the roadside equipment and the remote database; ③ is the roadside communication facility, mainly including the data storage part and the short-range wireless communication part; ④ is the wireless communication link, the link is two-way communication; ⑤ indicates the wireless network coverage of the roadside communication facility, when the vehicle travels within the range, the short-range wireless communication facilities are automatically connected to exchange data. When the vehicle passes the range, the communication link is automatically interrupted; ⑥ is the automated vehicle; ⑦ and ⑧ are the road sections 1 and 2 respectively. The segmentation of the roads is based on the layout distance of the adjacent two roadside communication facilities. The roadside communication facilities of the urban road are arranged at each intersection. The communication facilities on the middle road of the expressway are arranged at a distance of 1 km. The arrangement of the distance can be appropriately adjusted according to the actual traffic conditions. In addition, the distance of the roadside communication facilities is also affected by the short-range transmission device. For example, the coverage of the WIFI is large, the distance between the two communication facilities is relatively long. On the contrary, the coverage of the RFID is small, therefore the distance between the two communication facilities is small. During the layout process, it is necessary to ensure that there is no overlap between the two communication coverages ⑤ to avoid data transmission aliasing, resulting in data failure. The communication process of the vehicle road communication technology is: when the vehicle ⑥ drives into the road section, the communication facility ③ automatically connects with the vehicle ⑥ to perform data interaction. The communication facility will transmit the roughness data of the ahead road section, abnormal pavement distress, accident information and etc. to the vehicle ⑥. At the same time, the vehicle ⑥ transmits the vibration information collected in the previous section to the communication facility ③, and synchronously updates the database through the wired network. When the vehicle travels to the road section 2, it interacts with the new roadside facility, and the process is the same as the road section 1.

As mentioned before, the short-range wireless transmission module in the roadside communication facilities can adopt multiple technologies such as WIFI, ZIGBEE, and RFID. The ZIGBEE short-range wireless transmission module is recommended in the urban road environment. Because the ZIGBEE module can realize directional data transmission. Meanwhile, the communication connection time between the two modules is millisecond, which provides sufficient communication time for data interaction.

The road conditions refer to road environment information including road surface quality, traffic flow, and abnormal conditions. The road surface quality refers to the flat curve of the road surface, the longitudinal slope and pavement roughness. The abnormal conditions described therein refer to many road distresses such as pits, misalignments, crowds, obvious ruts, speed bumps, and traffic accidents.

(2) The driving comfort prediction model described above mainly establishes the relationship between the driving comfort, the speed and the road conditions, and adjusts the driving speed of the vehicle to adapt to different driving conditions, thereby satisfying comfort requirements.

Driving comfort detection and evaluation is the basis for the construction of prediction model. This invention uses many three-axis acceleration sensors to measure the vibration at different positions in the vehicle, and uses the power spectral density analysis method to calculate the root-mean-square acceleration (RMSA) as the indicator. The weighting function is introduced by the international standard ISO2631. The weighted RMSA is used as an index to evaluate the comfort of the automated vehicle. The specific technical process is as follows:

At first, we select the model and the make of the testing vehicle, and the three-axis acceleration sensors are respectively mounted to the center of the backrest of the vehicle seat position, the center of the seat cushion, and the center of the two feet. The seat selected for installation is the main driving position. The sensors in three positions require to be fixed firmly to avoid additional sloshing.

The testing vehicle drives on the roads with different conditions to collect the three-axis acceleration inside the vehicle. In order to ensure the reliability of the calibration results, the road surface to be tested adopts a straight-line segment of not less than 300 meters. The testing road roughness is 1 m/km, 2 m/km, 3 m/km, 4 m/km, 5 m/km, 6 m/km respectively. The above six roughness values are all expected values, and may have certain errors when actually selected, but it is necessary to ensure that the actually selected values belong to different roughness intervals.

On the same road, the vehicles are driven at 20, 30, 40, 50, 60, 70, 80, 90, 100, 110, 120 km/h, respectively, to record the vibration of the three-axis acceleration. The sampling frequency is 100 Hz, covering the human body perception 0-80 Hz. The range of the acceleration sensor is ±8 g (1 g≈9.8 m/s$^{-2}$). The comfort prediction model processing flow is shown in FIG. 3.

Firstly, the autocorrelation function of the acceleration sequence in the time series is solved, then the power spectral density function of the vibration is obtained by solving the Fourier transform of the autocorrelation function:

$$S_\alpha(\omega) = \int_{-\infty}^{+\infty} R_\alpha(\tau) e^{-j\omega t} dt \quad (1),$$

where, $R_\alpha(\tau)$ is the autocorrelation function of the vibration, $S_\alpha(\omega)$ is the power spectral density (PSD) function of the vibration, $\omega$ is the angular frequency, and $j$ is the imaginary unit. Since the human body's perception of vibration is similar between adjacent frequencies, but the difference is large in different frequency bands, the one-third octave bandpass filtering is proposed to calculate the PSD of each band. Considering that the effects of different frequencies on human comfort are not the same, a weighting value of each frequency band is used to obtain the weighted RMSA, as shown in equation (2):

$$\alpha_w = [\Sigma_1^{23} \omega_i^2 \cdot \int_{li}^{ui} S_\alpha(f) df]^{0.5} \quad (2),$$

where $\alpha_w$ is the weighted RMSA, ui, li is the upper and lower frequency values of the i-th frequency band, $\omega_i$ is the weight of the ith octave band, and $f$ is the frequency. Given the influence of different positions, such as the seat back, the seat cushion, the pedal position, and different axial directions, we calculate the integrated weighted RMSA, as in formula (3):

$$\alpha_v = \sqrt{\Sigma_1^3 [\alpha_m^2 \cdot \Sigma_1^3 (\beta_n \cdot \alpha_{mn})_2]} \quad (3),$$

where, $\alpha_v$ is the integrated weighted RMSA, $\alpha_m$ is the position weighting coefficient, m=1, 2, 3 respectively represents the seat cushion, seat back and pedal position. $\beta_n$ is the axial weighting coefficient, n=1, 2, 3 respectively represents the x, y, and z axis. $\alpha_{mn}$ is the uniaxial weighted RMSA at the m position in the n direction. Through the formula 1-3, the integrated weighted RMSA under different roughness sections and different speed can be obtained as an index for evaluating the comfort, and the specific weighting values can refer to the international standard ISO2631-1997. The tests under different speed are performed 3 times in each group, and the integrated weighted RMSA of 3 times is averaged as the comfort indicator.

Using comparative testing data, a multivariate linear regression was established with the comfort of the road segment as the dependent variable, the driving speed and the international roughness index IRI value as the independent variable, as shown in equation (4):

$$\alpha_v = p \cdot v + q \cdot IRI - l \quad (4),$$

where, $\alpha_v$ indicates the integrated weighted RMSA, v is the driving speed, IRI is the international roughness index, p, q, l is model parameters.

(3) According to the vehicle communication technology described in (1), the vehicle can obtain the road roughness and abnormal conditions of the ahead road section from the roadside facilities. The abnormal conditions mainly indicate the pavement distresses that are difficult to detect, and their impact on safety is low, but the impact on comfort is large, including: bridge approach settlement, pits, ruts, speed bumps, and etc.

When the vehicle receives the data, it will analyze whether its speed needs to be adjusted according to the current road conditions and the current driving status of the vehicle. If the difference between the roughness of the ahead road section and the current position is within 10%, and there is no abnormal condition, such as the condition (5):

$$\frac{|IRI_{adv} - IRI_{now}|}{IRI_{now}} \leq 10\% \ \& P = 0, \quad (5)$$

where $IRI_{adv}$ is the value of the ahead road roughness, $IRI_{now}$ is the current road roughness, and P represents whether the abnormal condition occurs. If the P is 0, the abnormal condition does not occur, and vice versa. If the condition (5) is satisfied, the vehicle speed does not need to be adjusted, and the speed upper limit obtained according to the formula (4) can be continuously driven at a constant speed;

If the difference between the roughness of the ahead road section and the current position exceeds 10%, or there is abnormal condition, then enter the speed adjusting phase, that is, the condition (6) is satisfied:

$$\frac{|IRI_{adv} - IRI_{now}|}{IRI_{now}} \geq 10\% \| P = 1. \quad (6)$$

(4) Since the roughness of the road surface is constantly changing, in order to ensure the driving comfort throughout the autonomous driving, the vehicle needs to continuously adjust the speed according to the road information ahead. Thus, the speed change between the different sections, i.e. the acceleration and deceleration processes, requires a comfort-based speed curve to ensure that the perceived comfort of the user remains within a reasonable range during the whole process.

The driving comfort in the uniform driving phase is mainly determined by the vertical vibration. However, the longitudinal (i.e., driving direction) acceleration changes due to acceleration/deceleration are also required to be considered in the speed adjusting phase. Therefore, the speed change curve needs to ensure that the longitudinal driving acceleration and the vertical vibration of the automated vehicle do not exceed a certain threshold during the speed adjusting process to ensure that the total weighted RMSA is within the expected comfort value range of the corresponding type of passenger. The velocity curve model based on the hyperbolic function is proposed to adjust the vehicle speed. The hyperbolic tangent function model is shown in equation (7), and its function image is shown in FIG. 4.

$$v = -\frac{b}{2} \tanh(k(t-p)) - \frac{b}{2} + v_0, \quad (7)$$

where v is the target speed, $v_0$ is the current vehicle speed, b is the speed difference, p is the model constant, t is the time, and k is the stability coefficient. Under the control strategy, the acceleration of the vehicle is shown in equation (8) and FIG. 5.

$$a_v = -\frac{bk}{2}(1 - (\tanh(k(t-p)))^2), \tag{8}$$

where $\alpha_v$ is the acceleration value, if the deceleration is too large during deceleration, it will also cause overall discomfort. Therefore, it is necessary to consider the speed change of the deceleration process and the longitudinal vibration generated by the roughness to ensure the overall vibration. The total weighted RMSA does not exceed the comfort threshold of 0.63, as in (9):

$$\sqrt{(w_k \cdot \max|\alpha_v|)^2 + (w_d \cdot \max|\alpha_d|)^2} \leq 0.63 \tag{9}$$

where, $w_k$ and $w_d$ are the weights of the deceleration and vertical vibration. $\alpha_d$ means the RMS value of the weighted acceleration in the vertical direction, which can be calculated based on the real-time speed and the IRI of the pavement. By solving the above inequality (9), the upper limit of the value of k can be derived. The calculation process is completed in the automated vehicle with a center processor.

The hyperbolic tangent function (equation (7)) is shown in FIG. 4, and the process simulates the actual deceleration behavior of the driver, that is, the deceleration is gradually increased when the deceleration intention occurs, and the deceleration is gradually decreased at the end of the deceleration process, shown as an anti-S type. In the figure, $k_2 > k_1$, we can see that the curve $k_2$ is more gradual. In practice, the hyperbolic tangent function described in equation (7) when the time approaches 0, or infinity, the function dependent variable can only approach the $v_0$ and $v_0 - b$ infinitely, but never reach it. Therefore, a weak influence coefficient $\varepsilon = 0.01$ is added during the speed generation process, that is, the initial speed is set as $v_0 + \varepsilon$ during the calculation process. The deceleration time of the available vehicles is:

$$\Delta \tau = \frac{\operatorname{artanh}\left(\frac{b}{b+2\varepsilon}\right) - \operatorname{artanh}\left(\frac{-b}{b+2\varepsilon}\right)}{k}. \tag{10}$$

Therefore, by solving (9) and calculating the k value, generally 95% of the upper limit of the calculation result is taken as an implementation parameter, and the velocity generation curve can be determined according to the formula (7).

When it is detected that there is an abnormal condition on the road ahead, such as the bridge approach settlement, the speed curve of the abnormal condition is required. Under such abnormal conditions, a local obvious bump is mainly generated, resulting in a large degree of comfort reduction. Different from the roughness of the road surface, the abnormal conditions of the road appear relatively random. In some cases, the vehicle deceleration distance is short, it is necessary to effectively adjust the vehicle speed and reduce the mutual influence of the deceleration process and the vehicle vibration.

The impact of abnormal conditions on comfort is mainly reflected in two aspects. One is the influence of the change of acceleration itself on comfort, and the other is the influence of jerk change on comfort. During the driving process, the expected acceleration jerk should not exceed 2.94 m/s³. In the hyperbolic function shifting process, the jerk is shown in equation (11).

$$\frac{\partial^2 a}{\partial t^2} = bk^3 \cdot \left(1 - \tanh^2(k(t-p))\right) \cdot \left(1 - 3\tanh^2(k(t-p))\right). \tag{11}$$

In order to ensure equation (11)≤2.94 m/s³, then the k should follow:

$$k \leq \frac{3.64}{\sqrt{b}}. \tag{12}$$

While ensuring the acceleration jerk within the acceptable threshold, it is also necessary to ensure that the vibration acceleration under a reasonable range. In terms of vibration, the same control strategies as the speed adjusting phase are used to lower the integrated weighted RMSA. The difference is that due to the random effect of abnormal conditions, the vehicle may not have enough deceleration distance to design the optimal deceleration curve. Therefore, the model parameters (k and b) are obtained by solving the following nonlinear optimization equations, as shown in equations (13)-(16):

$$\min a_{dv} = \sqrt{(w_k \cdot a_v)^2 + (w_d \cdot \max|a_d|)^2} \tag{13}$$

$$\text{s.t.} \tag{14}$$

$$s_l \geq \frac{2}{k}(v_0 + \varepsilon) \cdot \operatorname{artanh}\left(\frac{b}{b+2\varepsilon}\right) + \frac{b+2\varepsilon}{2k} \ln\left(\frac{\varepsilon}{b+\varepsilon}\right)$$

$$v_0 - b \geq 0 \tag{15}$$

$$b, k > 0, \tag{16}$$

where $s_l$ indicates the distance of the automated vehicle from the nearest abnormal condition, if the distance is long, the constraint (14) is an invalid constraint, and the process of solving the k value is the same as the speed adjusting phase; if it is small, the nonlinear optimization equation is required to derive the best combination of k and b. Then the speed curve can be generated by equation (7).

In practice, the lower threshold of the solutions of inequality (9), inequality (12) and nonlinear programming (13)-(16) is selected as the final model parameter, so that all three situations meet the driving comfort requirements.

(5) The above-mentioned machine is a pavement friction performance detection system, which is mainly equipped with a self-stabilizing high-definition camera and a laser focusing device on the vehicle, and is installed at the middle of the two front lights of the vehicle. The lens is placed downward, and the length from ground is not below 10 cm. The laser focusing device (external/built-in) assists the camera to move the focus, ensuring the accuracy of photo shooting. The self-stabilizing high-definition camera takes a sampling frequency of 0.5 Hz and the pixel requirement is not less than 800*1200 pixels. At the point, the collected dynamic photos are transmitted to the vehicle terminal through a wired connection. FIG. 6 shows the machine vision inspection road surface anti-sliding performance flow chart. The flow for inspecting road surface anti-sliding performance includes: image acquisition; image transmission; LBP feature calculation; feature histogram drawing; mixed Gaussian distribution model; parameter determination; judgment on whether there is a support vector machine model, go to 'support vector machine model' if no, go to 'support vector machine model determination' if yes; and evaluation of anti-slip performance. The specific operation process is as follows:

In the vehicle terminal, each photo is converted into a local binary method (LBP) into an LBP matrix form, and the local binary method mainly includes:

(5.1) Extract any point in the image, and select 9 pixels around 3×3, with the window center pixel as the threshold, compare the gray value of the adjacent 8 pixels with it. If the surrounding pixel value is greater than the center pixel, the value of the pixel is marked as 1 and 0 otherwise. In this way, 8 points in the 3*3 neighborhood can be compared to produce an 8-bit binary number (usually converted to a decimal number, that is LBP value, a total of 256), that is, the LBP value of the center pixel of the window is obtained, and this value is used to reflect the texture information for this area, as shown in FIG. 7.

(5.2) Convert the LBP binary matrix into a decimal number in a clockwise order, and select the 12-point direction in the first place. The calculation formula is as follows:

$$LBP(x_c, y_c) = \sum_{p=1}^{P} 2^{p-1} s(i_p - i_c)$$

In the middle:
$LBP(x_c, y_c)$=LBP value at position,
P=pth adjacent point,
$i_p$=grayscale of the pth adjacent point,
$i_c$=grayscale of the middle element,
s=s(i)=1, if and only if i≥0; or other, s(i)=0.

(5.3) After calculating the LBP values of all the elements in the picture, draw a histogram and count the probability density of each component, where the abscissa is 0-256, which is the decimal value of LBP, and the ordinate is the probability density function, for M The calculation formula of M×N image processing is as follows:

$$H(k) = \sum_{m=1}^{M} \sum_{n=1}^{N} f(LBP(m, n), k), k \in [0, K],$$

$$f(LBP, k) = \begin{cases} 1, & LBP = k \\ 0, & \text{otherwise} \end{cases}.$$

In the middle:
H(k)=LBP histogram of the image, and
K=maximum LBP value, no more than 256.

The frequency histogram has 16 statistical units, that is, the groups are 0-16, 17-32, 33-48, . . . , 241-256, as shown in FIG. 8. Among them, LBP in FIG. 8a presents a unimodal distribution, while in 8b it presents a bimodal distribution. This shows that the pavement texture corresponding to 8b is richer and the anti-skid performance is better.

(5.4) Calculate the LBP histogram fitting parameters described in the step (3) based on the mixed Gaussian distribution model. The Gaussian distribution model is as follows:

$$P(y|\theta) = \sum_{j=1}^{J} \alpha_j \phi(y|\theta_j)$$

$$\phi(y|\theta_j) = 1/\sqrt{2\pi} \sigma_j \exp[-(y-\mu_j)^2/2\sigma_j^2]$$

In the middle:
$P(y|\theta)$=Probability density function of mixed Gaussian distribution PDF,
$\theta_j$=vector characterizing the unknown parameters of the jth component,
$\alpha_j$=the coefficient of the jth Gaussian component quantity,
$\phi(y|\theta_j)$=Gaussian probability density function of the parameter,
J=number of mixed Gaussian distribution components, and
$\sigma_j$, $\mu_j$=variance and mean of the jth Gaussian component.

The mixed Gaussian distribution contains three positional variables: the coefficient of each Gaussian component, the mean of each Gaussian component, and the variance of each Gaussian component. The model parameters can be solved by the EM algorithm. The results are shown in FIG. 9. FIG. 9 shows the mixed Gaussian distribution model morphology on different anti-sliding performance parameters (BPN), where the higher the BPN, the better the anti-sliding performance. The mean, variance and coefficient of two Gaussian functions in the mixed Gaussian distribution can be obtained by the method described in the step (4).

(5.5) Feature recognition based on support vector machine. The model parameters described in step (4) are input into the support vector machine model, and the actual measured road surface anti-slip performance results are used as training targets, and model training is performed to create a multi-dimensional support vector machine model. In practical applications, the image can be subjected to the above (1)-(4) step processing in real time, and the support vector machine model of step (5) can be used to quantitatively classify the road surface anti-sliding performance, and the calculation result feedback to the unmanned vehicle computing side to assist driving decisions.

(6) The pre-sensing system design of the vehicle abnormality based on road vibration is mainly based on the spectrum analysis of the road surface vibration to realize the classification of the vehicle load condition. When the vehicle overload phenomenon is detected, it is considered that the vehicle abnormality occurs and is accompanied by the risk of the occurrence of an accident. The road surface vibration described therein refers to the Z-axis (vertical ground-up) acceleration of the road surface.

The relationship between road vibration and vehicle load condition is the basis for the early perception of vehicle abnormal conditions. The present invention uses a three-axis acceleration sensor to measure the acceleration information of the road surface by road test, and uses power spectral density analysis and frequency band division to measure different vehicle passing. When the energy distribution of the road vibration is used, the support vector machine method is used to quantify the distribution of the energy of the road vibration under different frequency bands when the vehicles of different load classifications pass. The specific technical process is as follows:

The test section is selected, and the three-axis acceleration sensor is placed at 10 cm away from the edge of the road. The fixed sensor ensures no additional sloshing, and the measured data truly reflects the road vibration. The specific placement position is as shown in FIG. 10:

In the model establishment stage, in addition to obtaining road surface vibration information, it is necessary to obtain the load information of the passing vehicle through video surveillance Mainly completed: vehicle load information acquisition, road vibration data extraction, power spectrum analysis of road vibration data, distribution calculation of vibration energy in different frequency bands, and support vector machine calculation of vehicle load and energy distribution relationship model.

After getting the vehicle through the video, the following three steps need to be completed:

1, Time Axis Alignment

The time axis alignment mainly performs the corresponding work of the vehicle elapsed time and the vibration data time. Since the road vibration is the response of the system on the road surface under the excitation of different driving loads, it is necessary to align the time axis to ensure that the analyzed vibration data segment is the data generated by the vehicle.

2, Interference Removal

The vehicle abnormality pre-sensing system based on road vibration is to analyze the abnormality of the vehicle by generating road vibration and then passing the road vibration, so it is necessary to remove all non-vehicle vibrations, such as pedestrians, mopeds, and etc., in the video.

3, Vehicle Screening

The vehicle screening includes: selecting vehicles with different loads based on the video content; obtaining the specific time of the vehicle and corresponding to the vibration data; and then performing the next vibration analysis.

For the acquired road vibration information, taking the second of the vehicle as the center, select 4 s as the window function to obtain the truncation function $f_T(t)$ of the vibration function $f(t)$, which can be expressed as:

$$f_T(t) = \begin{cases} f(t) \left( |t| \leq \dfrac{T}{2} \right) \\ 0 \left( |t| > \dfrac{T}{2} \right) \end{cases}. \quad (21)$$

Calculating the power spectral density for the truncation function can be obtained:

$$p(\omega) = \lim_{T \to \infty} \dfrac{|F_T(\omega)|^2}{T}. \quad (22)$$

Where $F_T(\omega)$ is the Fourier transform function of the vibration function and co is the angular frequency.

On the basis of obtaining the power spectral density of the vibration data, it is divided into 10 segments according to the vibration frequency, and respectively calculate 0-10 Hz, 10-20 Hz, 20-30 Hz, 30-40 Hz, 40-50 Hz, 50-60 Hz, 60-70 Hz, 70-80 Hz, 80-90 Hz, 90-100 Hz energy of the ten frequency bands, such as the formula:

$$E_T = \int_{-\infty}^{+\infty} f_T^2(t) dt = \dfrac{1}{2\pi} \int_{-\infty}^{+\infty} |F_T(\omega)|^2 d\omega. \quad (23)$$

Using the calculated distribution of vibration energy in different frequency bands, the support vector machine is used to establish the relational model. The energy ratio of the 10 frequency bands is the independent variable, and the vehicle load is classified as the dependent variable. Thereby, the vehicle load classification based on the road vibration data is realized.

On the basis of obtaining the vehicle load classification model, the system designed the early sensing function of vehicle abnormal conditions. The road vibration information passing the vehicle is calculated in real time by arranging a three-axis acceleration sensor on the road side. When the detection finds that an overloaded vehicle has passed, the system records the vehicle information and the transit time, and transmits the abnormality information to the central server and the abnormal vehicle.

(7) According to the comfort speed curve parameter optimization in (3), the specific change curve of vehicle speed in the case of known road information can be obtained, so as to ensure that driving comfort is within a reasonable range. For automated vehicles, the road information ahead is the basis and premise of all operational changes in its operation. So vehicles need to get as much comprehensive road information as possible and as quickly as possible.

The specific details of vehicle-road communication are detailed in (1) above, which mainly involves the data base of road information database and the transmission of road information. However, road driving is a process with highly random changes. Abnormal traffic conditions may occur at any time. Once occurring, a stable and rapid transmission mechanism is needed to realize the transmission and release of abnormal condition information.

Abnormal traffic condition warning mechanism includes three parts: the first one is timely discovery after the accident; second is timely release of accident information; and third is the timely termination after the completion of accident treatment.

When there is an accident on the road, the premise of releasing the accident information timely is to be able to find the accident in a timely manner. However, the detection of any passive warning mechanism will be later than that of the vehicle in accident itself. The existing accident warning can be divided into two categories. One is to realize real-time detection of the highway itself and surrounding environment based on a large number of monitoring. The second kind adopts the method of combination of qualitative and quantitative methods to describe, track, analyze and forecast the development trend of highway traffic safety. Firstly, a highway accident warning index system that can comprehensively evaluate the development status of traffic accidents is established. And then the data from statistical departments or mobile phones are used to calculate the indexes. On the basis of quantitative and qualitative analysis, the development and change trend of road traffic accidents can be evaluated comprehensively. When most indexes are close to the warning line, an alarm should be triggered. However, these methods are based on a large number of real-time monitoring and are only used in a few highways, which is difficult to popularize. In addition, the existing dynamic accident warning finds the accident by finding the change of state of the road after the accident occurs. The judgment standard is the situation after multiple vehicles are affected by the accident, but if each vehicle can release information automatically, the accident can be detected and the accident information can be uploaded in the first time.

After abnormal traffic conditions occur, timely release can enable subsequent drivers to take evasive measures or change routes in advance, thus reducing the possibility of secondary accidents. There are eight ways to release emergencies: traffic broadcast, speed limit sign, variable message board, Internet, on-board terminal, short message platform, roadside broadcast and public information terminal. Traffic information broadcast has the advantage of area wide, wide influence, simple technology, mature, easy to promote. However, dynamic change for the traffic on the time and place is difficult. The advantage of speed limit sign is that the driver is familiar with the speed limit sign and can control the speed flexibly. But the speed limit sign information only applies to a particular section of a highway. Variable information board can be understood easily and can provide the whole service level of road network and the information such as travel time. But the information provided is limited, not suitable for the network environment. The information released by the Internet is large, and updated timely, which can meet the different needs of drivers. However, the network and computer terminals are required to release information, which is limited. The on-board terminal provides large amount of information and is highly targeted. It can provide information according to the needs of drivers, but its investment is large. The short message platform has a large amount of information and can provide information according to the needs of drivers, but it has a certain impact on driving safety. Roadside broadcasting can tell drivers the reason of speed limit. And drivers will pay more attention to this speed limit. But the initial investment is large, and the maintenance cost is high; The public information terminal has a large amount of information and is updated in a timely manner, but it belongs to the information release before travel, which is of limited help to drivers on the road.

This invention proposes an early warning mechanism for abnormal traffic conditions of automated vehicles so as to achieve early detection, early release and early resolution of accidents. FIG. 14 shows the accident information transmission mechanism diagram, and detailed description is as follows:

When the accident occurs, the on-board warning system can detect the accident in time through the sensor, then the accident situation, vehicle information, accident time and vehicle GPS information are packaged and stored as an accident data label. At the same time the vehicle in accident begin to search the surrounding data receivers. There are three situations during data transmission:

Category 1: the accident vehicle is near the beginning or end of road section. At this time, the accident vehicle is within the transmission range of roadside communication equipment. The accident vehicle can upload the accident information stored in the vehicle to the database of road information through ZIGBEE. Then this accident information can be released rapidly. As shown in FIG. 11, optionally, ⑥ is the accident vehicle in road section 1 (⑦).

Category 2: the accident vehicle is not within the transmission range of the roadside communication equipment, that is, the accident vehicle cannot directly upload the accident information to the database, but there are other vehicles nearby, as shown in FIG. 12, where, one of vehicles ⑪ and ㉒ is an accident vehicle. At this point, the RFID technology ㉝ is used to transfer the small-capacity accident information label to the surrounding vehicles. Then these vehicles can then transfer accident information to the surrounding vehicles, so that the accident information can be passed away. RFID technology can automatically identify target objects and acquire relevant data through radio frequency signals. Identification work does not require manual intervention, and it can work in various harsh environments. Vehicles that obtain accident information through RFID begin to search for roadside communication equipment at the same time of transmitting information. If the information is within the transmission range of roadside communication equipment, the information will be uploaded to roadside communication equipment and the transmission will be terminated.

Category 3: when the accident vehicle is not within the transmission range of the roadside communication equipment and there is no other vehicle nearby (default: the accident vehicle loses mobility here), as shown in FIG. 13. The accident vehicle keeps the accident information label and constantly searches, transmitting the accident information immediately when the acceptable equipment is found.

By means of the above methods, the accident information can be quickly uploaded to the database of roadside communication equipment. Then, by means of vehicle-road communication technology, the accident information in the database can be sent to the vehicles in the road.

Among the vehicles which have received accident information, there are two categories. One is the vehicles that have not reached the starting position of the section when the database updates the accident information. Such vehicles can obtain the accident information through vehicular communication and take evasive measures. Secondly, when the database updates the accident information, the vehicles and then enter this road section. The updated accident information in the database cannot be obtained through the roadside communication equipment. Therefore, this kind of vehicle needs to obtain accident information through the vehicle-vehicle RFID communication technology in the section in order to take evasive measures in advance. As shown in FIG. 15, where ⑩ is the first type of vehicle, ⑨ is the second type. In this way, the accident information can be transmitted to every vehicle that is about to pass through the accident section, to avoid the occurrence of a serial accident.

It is equally important to remove the warning information as soon as the accident site is processed. When the vehicle passes the road section marked with accident information, the data obtained by in-car sensors has little difference with that in the normal driving state, which indicates that the accident site has been restored. The disarming mark is then added in the accident information label received. The same mechanism can be used to upload the accident cancellation information to the roadside communication device to realize the early warning cancellation.

In addition to traffic accidents, there are other abnormal traffic conditions such as disaster weather and traffic congestion.

The current discrimination of traffic congestion mainly depends on the identification and processing method. And the discrimination is based on the acquisition of traffic state parameters. The congestion discrimination lags behind the detection of traffic state parameters, and the accuracy of congestion discrimination is affected by the accuracy of relevant parameters.

When the road is congested, the speed and braking of the vehicle traveling on the road will change. The change of these states can be recorded by the in-car sensors, and the comprehensive processing can analyze the driving state of multiple vehicles on the same road section to judge the congestion state of the road. The rapid release of traffic congestion can be achieved by using the abnormal traffic state transmission mechanism of this invention.

Based on the abnormal traffic condition information transmission mechanism in this invention, rapid detection and timely release of abnormal traffic conditions such as traffic accidents, severe weather and traffic congestion can be realized, as shown in FIG. 16:

(8) The data acquired by the GIS system has error, and the vibration data acquired by the vehicle traveling on the road can update and correct the GIS road condition information. The sensor placed in the car can record the vibration data during the traveling in real time. Through the analysis of the vibration data, the condition information of the driving road surface can be effectively restored. Therefore, the low-power short-range wireless transmission ZIGBEE technology can be utilized at the end of the road segment. The vehicle transmits the vibration data to the central processor to restore the measured road condition information, and compares and filters the information collected by the plurality of vehicles to realize the update and correction of the GIS road condition information.

In (1), the realization of the road communication technology is discussed through the roadside communication device. At the beginning of the road section, the roughness of the ahead road section, abnormal road distress, accident information, etc. are released to the vehicle, and the vehicle is instructed to calculate the driving parameters in advance. Includes speed, direction, etc. The information such as the roughness of the road section and the abnormal road surface distress is a database established by the geographic information system (GIS) to combine the road information collected with the spatial map.

The processing accuracy and update speed of GIS are limited. However, the performance of the road is constantly changing. Pavement performance is a technical term with a wide coverage. It refers to various technical performances of the road surface, such as road driving quality, distress conditions, structural mechanical response, driving safety, and fatigue, deformation, cracking, aging, and surface scattering of pavement materials. It is a term that refers to the various technical performance of pavements and materials. These performances of the pavement cover two aspects, one is the functionality of the pavement, which describes the performance of the pavement, such as the driving quality of the pavement (driving comfort) and driving safety; on the other hand, the structural nature of the pavement, which describes the structural condition (potential) of the pavement, such as the distress of the pavement, the mechanical response of the structure, and so on. In fact, these two aspects are not isolated, but have an intrinsic connection; the change in the condition of the pavement structure is the intrinsic reason for the change of pavement function. Corresponding to functional performance and structural performance, road distress is also divided into functional distress and structural distress. The former refers to surface distress that affects road surface driving quality and driving safety, and the latter refers to distress that affects the structural characteristics of the road surface. The types of distress such as buffing, pothole and bleeding mainly affect the safety and noise characteristics of the road surface, while the cracks, pits and deformations, and the unevenness of the project affect the driving comfort of the road surface. As the road surface usage time and the number of load actions increase, the structural condition of the road surface will continue to deteriorate. The deteriorating structural condition will be reflected in the service level of the road surface, resulting in the continuous decline of the functional characteristics of the road surface.

The continuous decline of pavement functional characteristics means the continuous change of pavement information. The core of urban geographic information system (GIS) is data. The real-time nature of geographic information data is one of the important indicators to measure its value. Real-time, accurate data is vital, but the status quo of data updates is not optimistic. According to statistics, the update rate of global topographic maps does not exceed 3%.

There are three types of existing urban basic geographic information update data sources: 1. Update the geographic information data according to the existing planning map. Corresponding updates to the geographic information database are made on the computer against the changes in the plan. Before the final confirmation of the results of the change, indicate "under construction" in the corresponding location of the electronic map. In addition, the road maintenance and repair department will also greatly change the road condition information for the maintenance of the road. After the maintenance, the road maintenance and maintenance department will provide the specific information of the maintenance to update the information of the database system. This requires information synchronization between the planning department and the database system. 2. Use photography and remote sensing data. In recent years, extremely high-resolution remote sensing data has become an important data source for urban GIS data collection and update. A typical example is the successful application of photogrammetry and remote sensing in land use dynamic monitoring. For key areas in the city where human activities have a large impact and the environment changes rapidly, regular and irregular pre-purchase of high-resolution remote sensing images (such as Quickbird) can be used to solve the problem. Relatively speaking, the cost is not high. And low-altitude platform remote sensing technology can also be used to get information. In general, image data has gradually become the main data source for basic geographic information update, but the rapid update of massive geographic information has not been resolved. 3. Use digital mapping, that is, conventional mapping methods. With the continuous development of social economy and high technology, measurement technology has gradually changed from ground to air. Advanced technologies such as aerial photography, satellite remote sensing, and GPS positioning are gradually becoming the mainstream means of data acquisition. However, in a small period of time, sporadic digital surveying still will play an important role in daily retesting and updating of geographic information data. As far as the current level of urban economic and technological development in China is concerned, not every city can use aerial photography and remote sensing. Ordinary small and medium-sized cities have to rely on surveying and mapping means to complete the data update of geographic information systems. For some common ordinary projects in the city, such as road reconstruction, community building, pipeline construction and other data updates, the conventional mapping method can show its flexibility and convenience.

In addition, the accuracy of data measured by GIS has not yet met the requirements required for the calculation of comfort for automated vehicles. It is recognized that its data accuracy includes position accuracy, attribute accuracy, time precision, and position accuracy is one of the important evaluation indexes of GIS data quality. The research object of vector GIS data position accuracy is mainly the geometric precision of points, lines and surfaces. The errors of these data are mainly derived from the errors of the basic data in the GIS database and the errors generated in the various steps of establishing the GIS database. Therefore, this invention proposes a GIS system data rectification mechanism based on vehicle sensing data to compensate for the lack of accuracy of the original database data, thereby more accurately ensuring driving comfort.

As mentioned above, the traffic management department assigns measured road distress, road conditions, and abnormal traffic information, etc., to the GIS layer through GPS tags. However, there are errors in GPS positioning measurements. During GPS measurement, the ground receiving device receives the signal transmitted by the satellite, calculates the pseudo distance between the ground receiving device and the plurality of satellites at the same time, and uses the spatial distance resection method to determine the three-dimensional coordinates of the ground point. Therefore, GPS satellites, satellite signal propagation processes, and terrestrial receiving equipment can cause errors in GPS measurements. The main sources of error can be divided into errors associated with GPS satellites, errors associated with signal propagation, and errors associated with receiving equipment.

Errors associated with satellite include satellite ephemeris errors, satellite clock errors, SA interference errors, and relativistic effects; errors associated with propagation paths include ionosphere refraction, tropospheric refraction, and multipath effects; errors associated with GPS receiver include receiver clock error, receiver position error, and receiver antenna phase center deviation.

With the technical support of the road communication, thousands of vehicles can become the data source of the database system. The on-board sensor can obtain data such as vibration and friction of the vehicle during driving, and these data are road condition response on the vehicle during a certain speed and direction driving. Through the response and the influence mechanism, the input of the road condition can be restored, thereby more accurately restoring the road condition information.

Through the vibration information returned by the vehicle at the end of the road segment, the central processing unit processes and restores the road surface information during the traveling of the vehicle, thereby updating and correcting the original database data. The main operation consists of three parts: adding pavement information, deleting pavement information and modifying pavement information.

Adding pavement information occurs when the vehicle acquires the road surface information in the road section before entering the road section to make a driving plan. When an unexpected vibration or response occurs, i.e., the information that does not appear in the database occurs on the road surface, and the vehicle records the response at this time. And the vehicle position information is uploaded to the roadside communication device at the end of the road segment as the added data information.

Deleting pavement information occurs when the vehicle acquires the road surface information in the road section before entering the road section to make a driving plan. When the vehicle travels in a position where the response should occur but does not occur, i.e., the original information of the database disappears in the road surface. For example, distress such as cracks in the road surface was repaired due to the maintenance of the road maintenance department. At this time, the vehicle record response and the vehicle position information are uploaded to the roadside communication device at the end of the road segment as the cut-down data information.

The vehicle obtains road information at the beginning of the road segment to plan the calculation of the speed and direction of travel. The vehicle's own response R also changes when the road information changes. If the difference between driving and expected response is within 10%, such as condition (17):

$$\frac{|R_{exp} - R_{now}|}{R_{now}} \leq 10\%. \tag{17}$$

In the formula, $R_{now}$ is the actual response measured when the vehicle passing, and $R_{exp}$ is the response measured when the vehicle passing the original road information condition. If the condition (17) is satisfied, it is understood that the influence of the vehicle's own factors is not included in the road information change.

If the difference between the measured response and the expected response exceeds 10%, that is, the condition (18) is satisfied, indicating that the change of road information is identified by the vehicle and needs to be updated or corrected.

$$\frac{|R_{exp} - R_{now}|}{R_{now}} \geq 10\%. \tag{18}$$

When the vehicle passes through and discovers that the road surface information changes, the vehicle information, the response information, and the GPS information are immediately packaged into data labels, which are defined as road surface information updates, and the packaged data is transmitted to the database system when it is driven in the transmission range of roadside communication facility. When the system finds that more than one vehicle uploads update information at the same location, the response information is processed to restore the road information and update to the database system. Thereby, the GIS road condition information update and rectification based on the automated vehicle sensing data is realized.

However, due to the error in GPS positioning, the positioning data is different when the vehicle passes the same position. Therefore, this invention introduces a position matching degree to solve the problem of inaccurate positioning accuracy. The position matching degree is defined as the degree of probability that an object corresponding to two different GPS positioning information is in the same position in the environment. It can be seen that the closer the two GPS positioning information is, the greater the probability that the corresponding object is in the same position in the real environment, and the higher the position matching degree. For example, when a vibration beyond expectation is detected, the position of this vibration as a temporary data to be confirmed is recorded; if position matching degree is greater than 2.1, this data will be added to GIS database. When a vibration within expectation is not detected, the position of this vibration as a temporary data to be deleted is recorded; if position matching degree is greater than 2.1, this data will be deleted from GIS database. The specific location matching formula is calculated as follows:

$$\varepsilon = e^{-(\delta_1 - \delta_2)^2} \tag{26}$$

In the middle:

$\varepsilon$ is the position matching degree;

$\delta_1$ is the GPS positioning information of the first object; and $\delta_2$ is the GPS positioning information of the second object.

The cumulative matching degree refers to the probability that an object corresponding to a plurality of different GPS positioning information is in the same position in the real environment. The cumulative matching degree of n objects is calculated as follows:

$$\varepsilon = e^{-\Sigma_{i=2}^{n}(\delta_1 - \delta_2)^2} \tag{27}.$$

BRIEF DESCRIPTION OF THE DRAWINGS

FIG. 8 shows the LBP statistical histogram diagram, among them FIG. 8(a) shows a unimodal distribution of LBP; FIG. 8(b) shows a bimodal distribution of LBP;

FIG. 9 shows the mixed Gaussian distribution diagram:

DETAILED DESCRIPTION OF THE INVENTION

Figure 1:
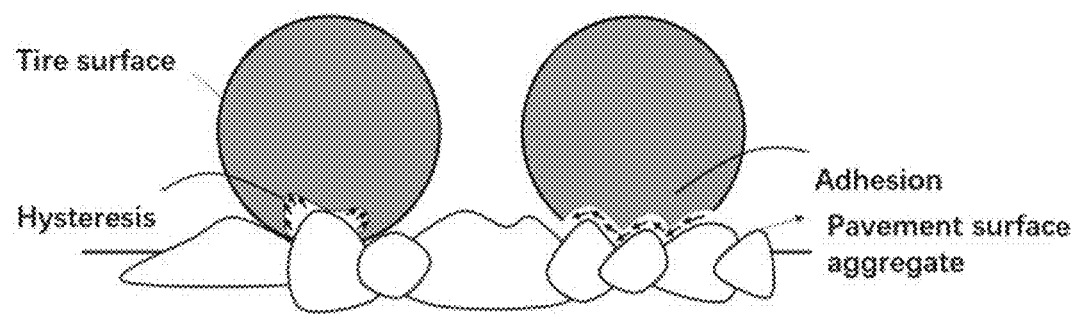
FIG. 1 shows the schematic diagram of road surface slip resistance.
Figure 2:
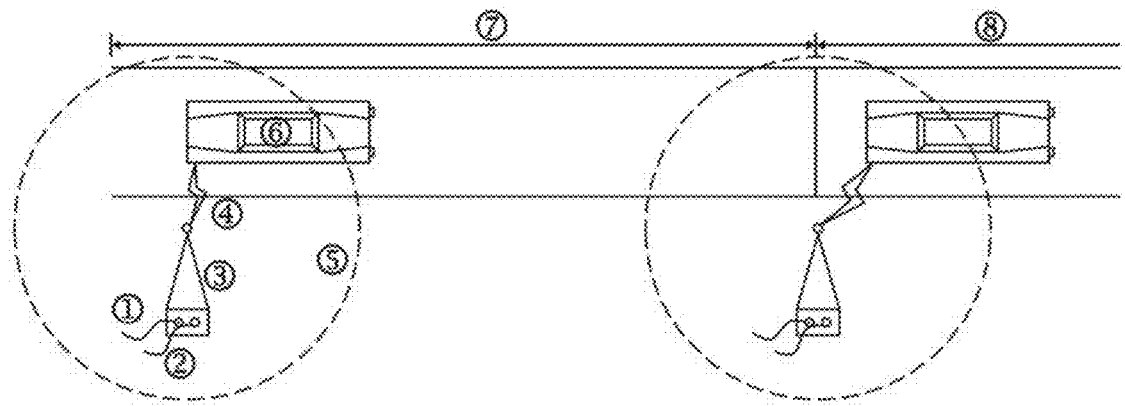
FIG. 2 shows the mechanism diagram of the roadside communication device.
Figure 3:
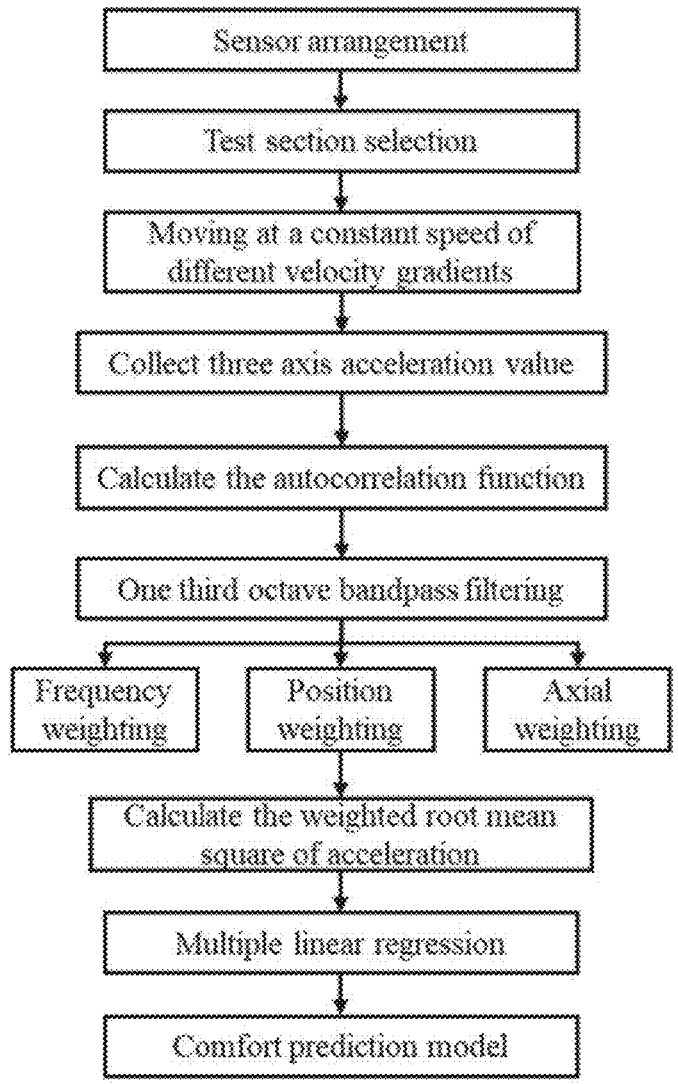
FIG. 3 shows the calculation flow chart of the comfort prediction model.
Figure 4:
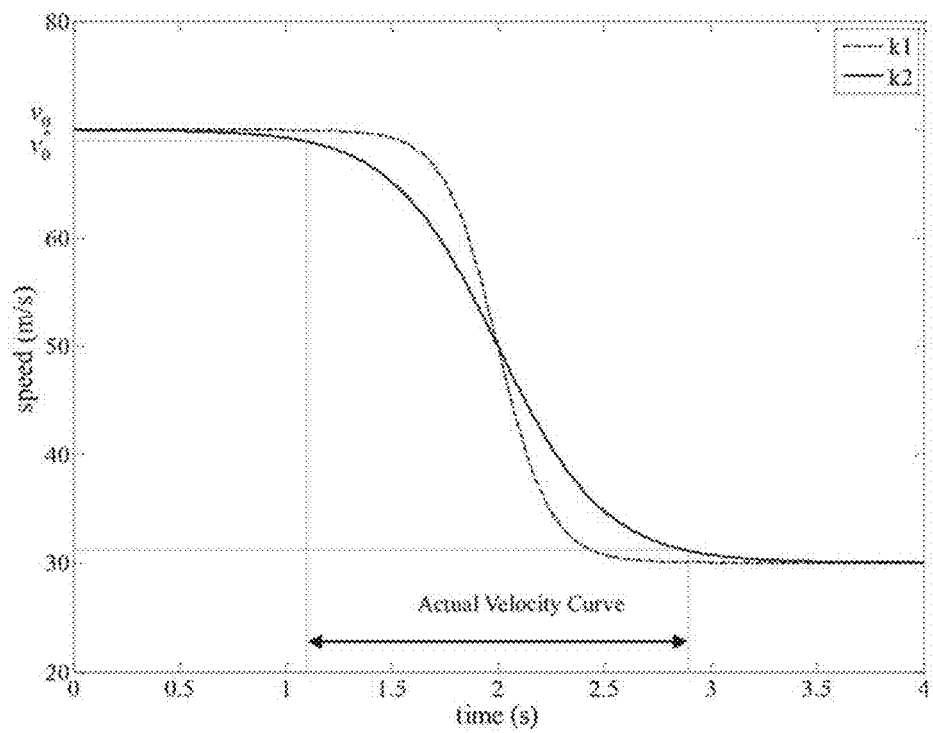
FIG. 4 shows the velocity change curve of the hyperbolic tangent function.
Figure 5:
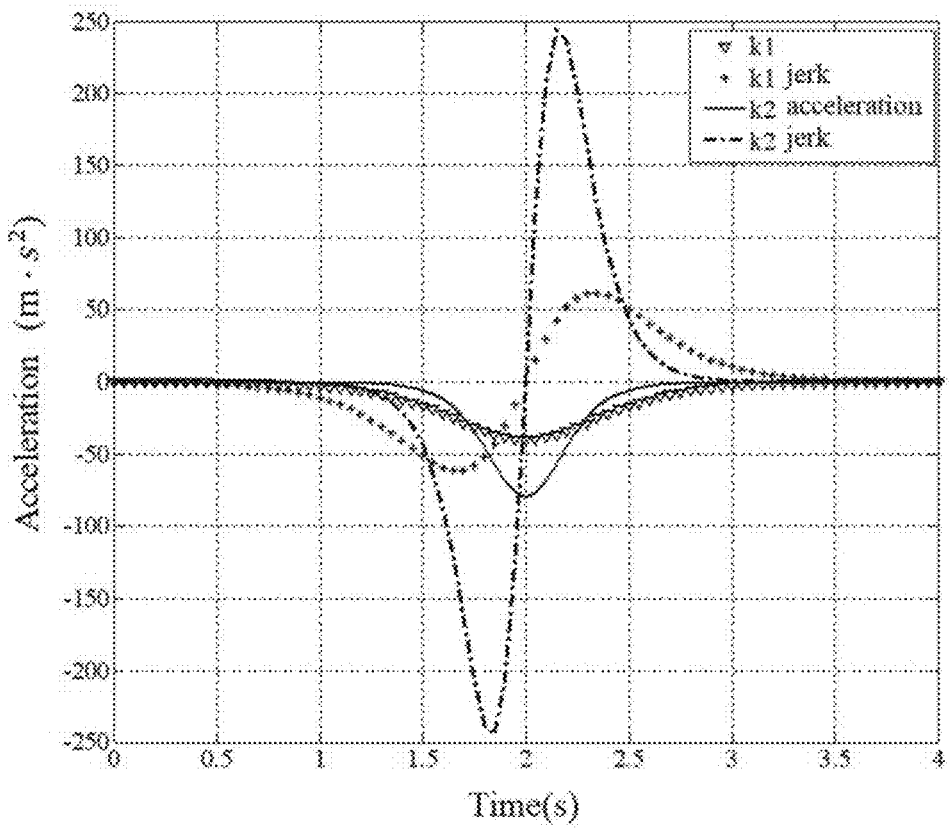
FIG. 5 shows the acceleration variation of the hyperbolic tangent function.
Figure 6:
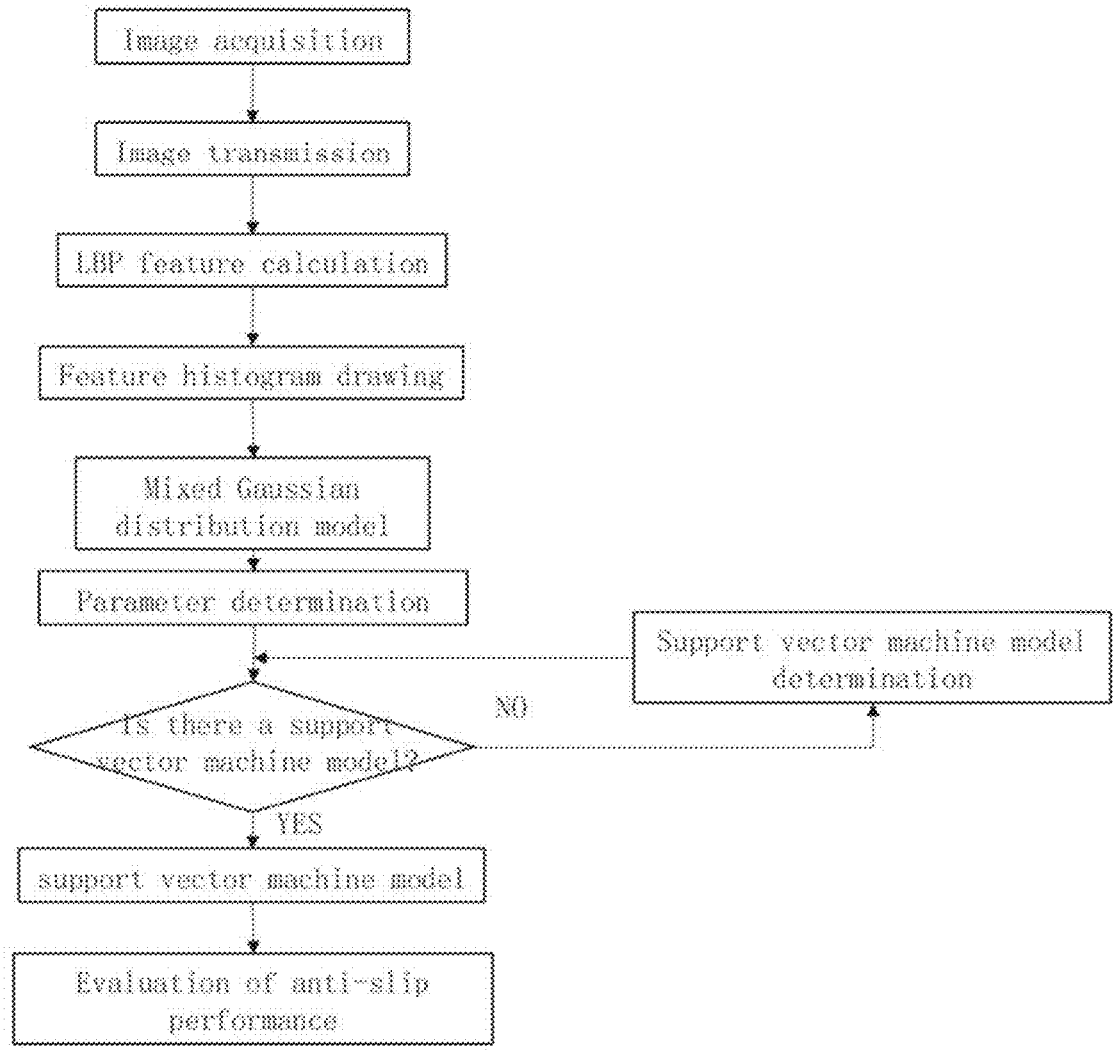
FIG. 6 shows the machine vision inspection road surface anti-sliding performance flow chart.
Figure 7:
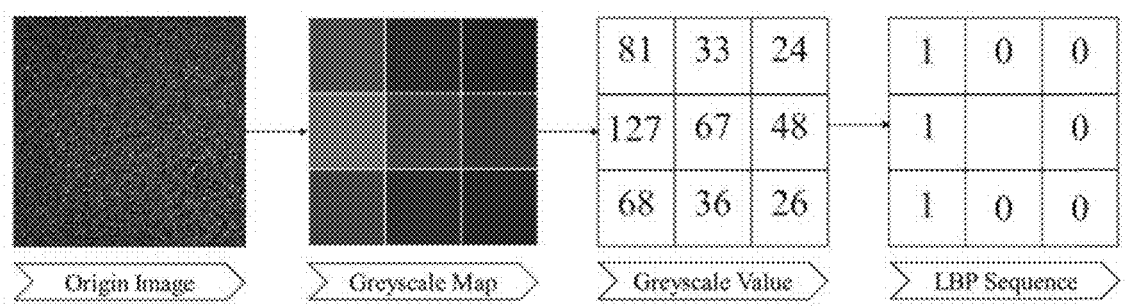
FIG. 7 shows the LBP solution process diagram.
Figure 10:
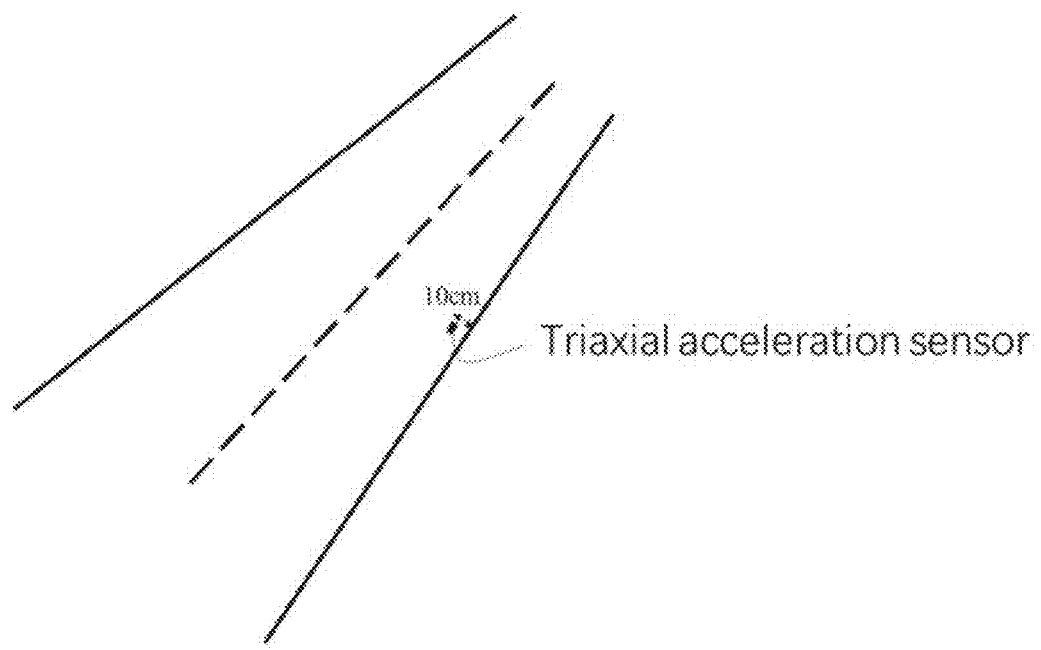
FIG. 10 shows the three-axis sensor placement position diagram.
Figure 11:
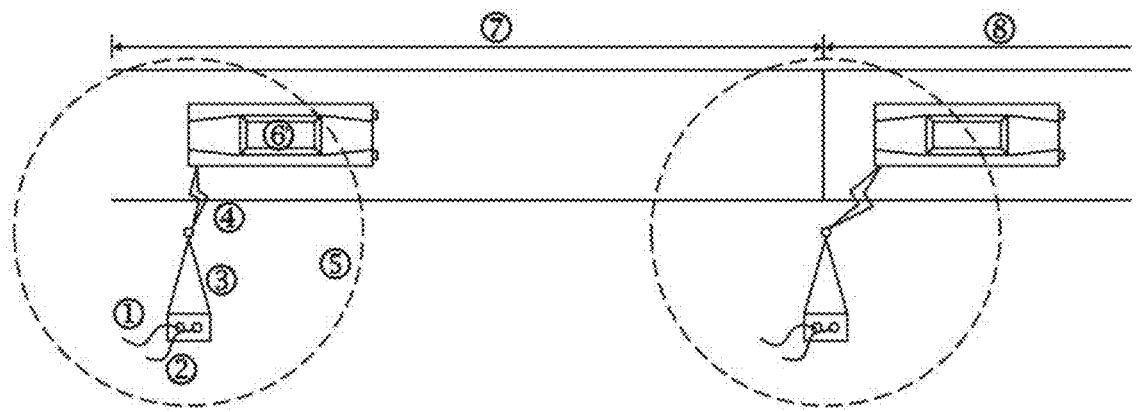
FIG. 11 shows the scene diagram of the accident vehicle at the beginning and end of the road. section when the accident occurs.
Figure 12:
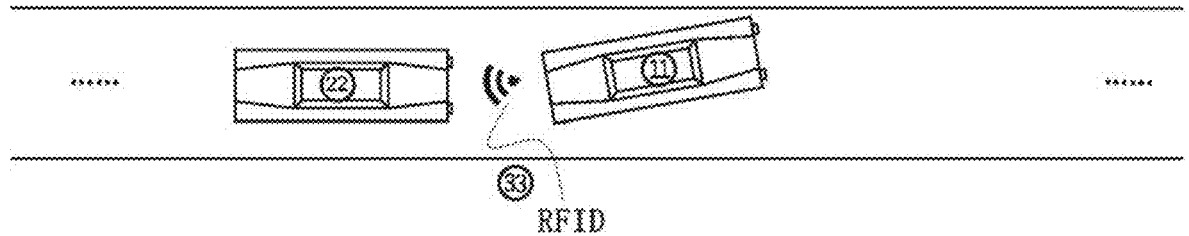
FIG. 12 is the scene diagram of the accident vehicle that can search other vehicles when the accident occurs.
Figure 13:
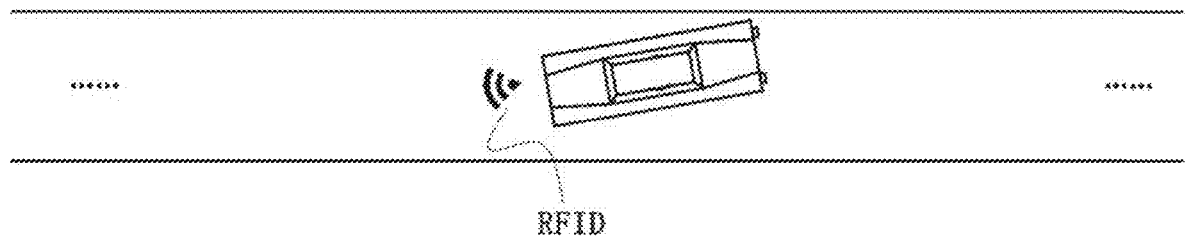
FIG. 13 is the scene diagram of the accident vehicle that cannot search other vehicles when the accident occurs.
Figure 14:
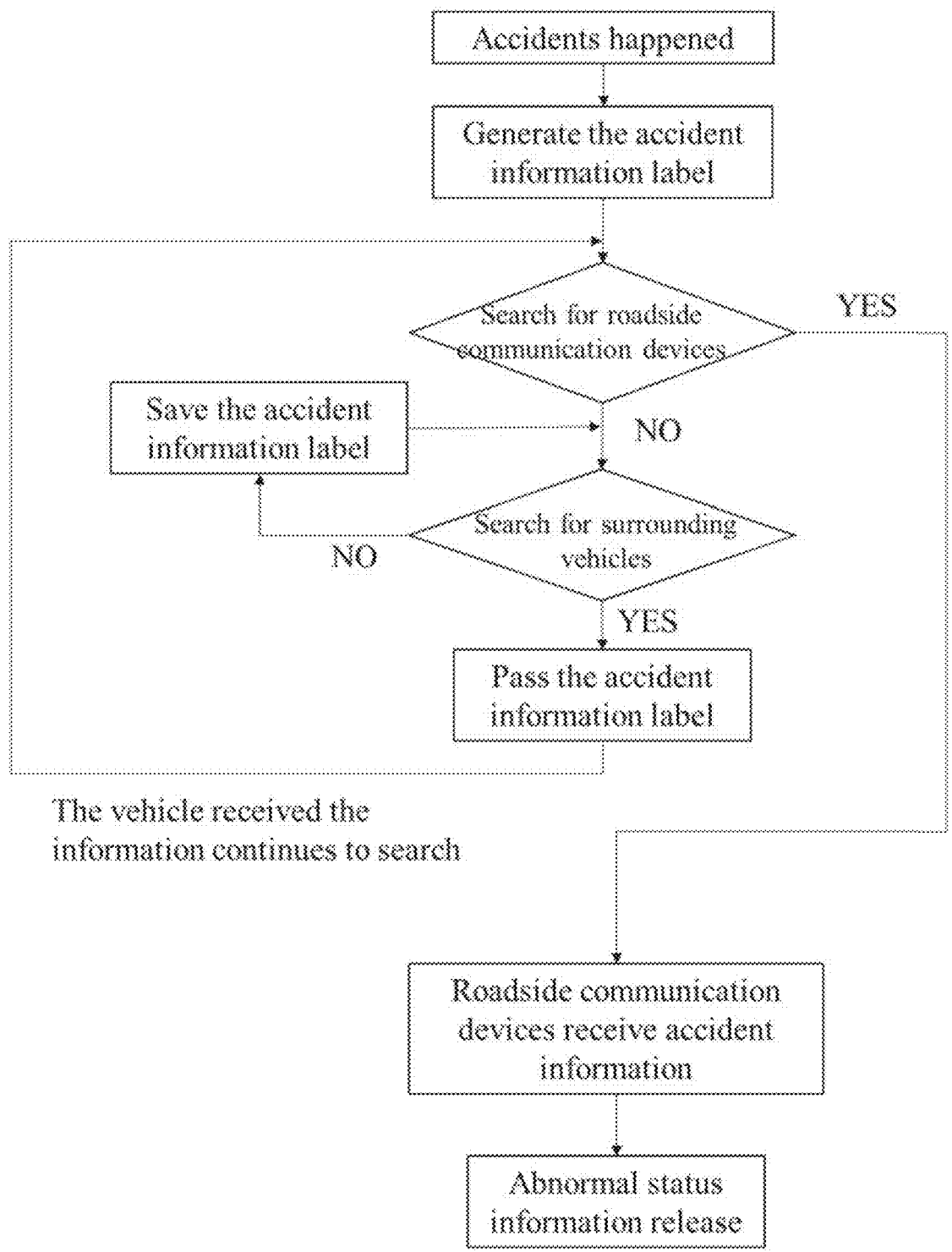
FIG. 14 shows the accident information transmission mechanism diagram.
Figure 15:
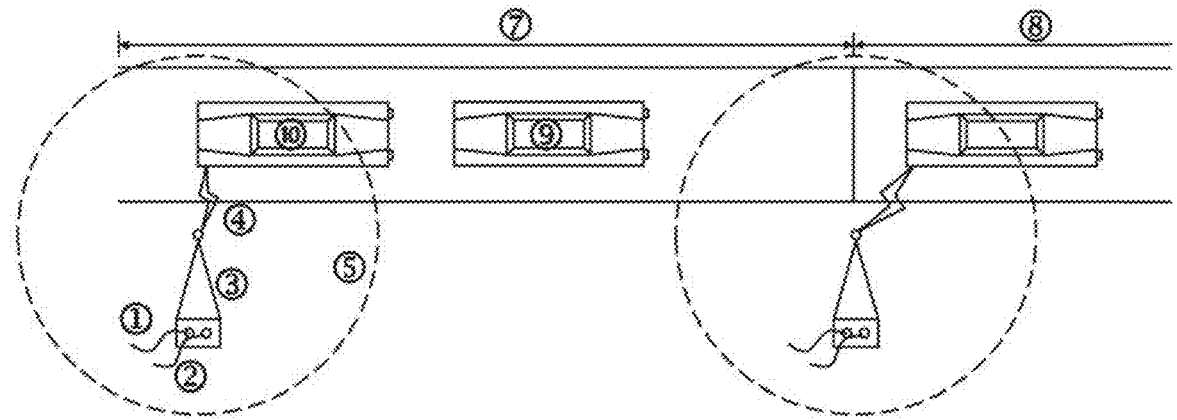
FIG. 15 shows the scene diagram of the driving position of the vehicle receiving the information when receiving the accident information.
Figure 16:
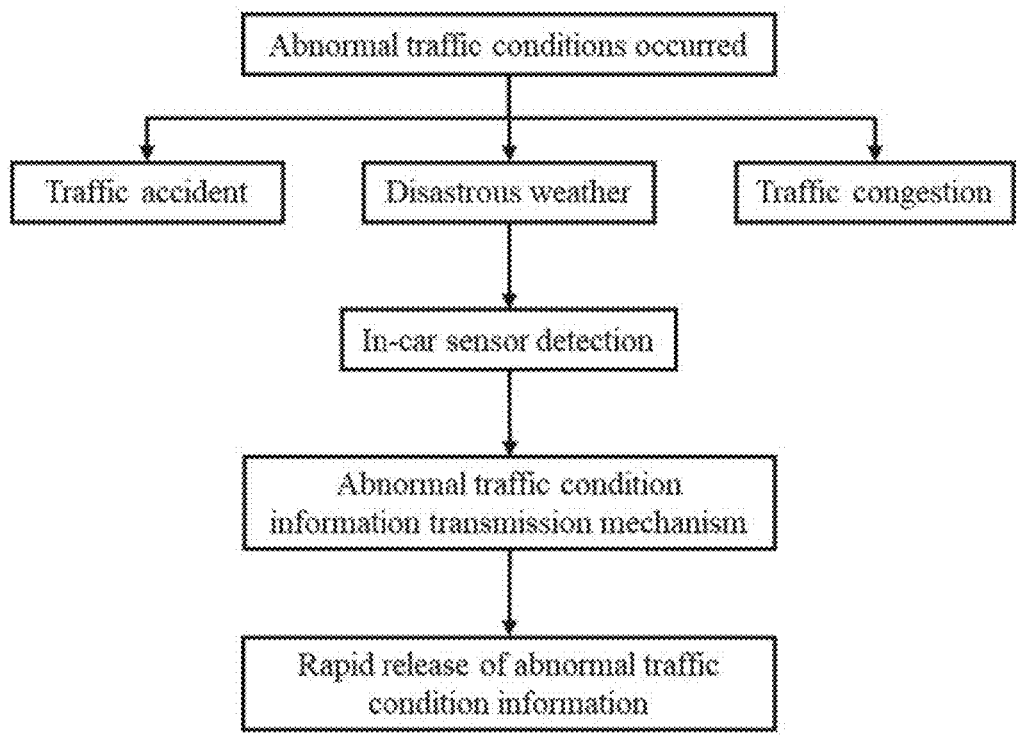
FIG. 16 shows the flow chart of rapid release of abnormal traffic status information.

According to the requirements of the invention, the vehicle road communication equipment is arranged: the arrangement interval of adjacent equipment is 1000 meters, and the roadside communication equipment includes the roughness and abnormal data of the ahead road section, and the international roughness index value IRI of the test section is 1.2 m/km and 2.7 m/km, and there is a bridgehead jumping position in the second section of the road. The distance of the roadside communication facilities is 100 meters, and the speed limit of the road section is 70 km/h. After the vehicle travels to the control section, the road surface condition data is received, and a comfort-based speed control strategy is performed.

Step 1 Determine if the Vehicle is in Safe Driving State

The environmental information collected by the sensors, cameras and probes of the self-driving vehicle is used to generate a safe speed curve by using the conventional technology. Since the flow rate of the road section is low, the test vehicle can use the highest speed limit for full speed running, that is, the vehicle speed is 70 km/h.

Step 2 Auto-Driving Vehicle Current Comfort Judgment

According to the correlation between driving comfort, vehicle speed and roughness IRI obtained by formula (4), the driving comfort is predicted as follows:

$$\alpha_v = 0.008 \cdot v + 0.298 \cdot IRI - 1.246$$

The calculated weighted the root-mean-square acceleration value is 0.3412 m/s$^2$, which satisfies the comfort requirement that less than 0.63 m/s$^2$, so the vehicle can continue to travel at 70 km/h Step 3 Speed Strategy Under Changing Road Conditions When the vehicle enters the second road, the roadside communication system will send the roughness and abnormality of the road ahead to the vehicle. When the vehicle receives a roughness of 3.7 m/km and there is a bridgehead jump, Speed changes are made to ensure driving comfort.

After the comfort calculation, it was found that the weighted root-mean-square acceleration was 1.9087 m/s$^2$ at a roughness of 3.7 m/km, which exceeded the upper limit of comfort. Therefore, it is necessary to reduce the speed to ensure comfort. If the degree is within the range, i.e., $\alpha_v \leq 0.63$ m/s$^2$, then the calculated speed cannot exceed 55 km/h, and the b value is 70−55=15 km/h.

$$k \leq \frac{7.2 \cdot \sqrt{0.3969 - (w_k \cdot (0.008 \cdot v_0 + 0.298 \cdot IRI - 1.246))^2}}{b \cdot w_d}$$

In the formula, $w_k=1$, $w_d=0.8$, and the comfort upper limit of the k value obtained by the formula (9) is 0.3712. On the other hand, in order to prevent the jerk from exceeding the comfort limit, the comfort upper limit of the k value can be obtained by the formula (12) to be 0.9400, so the k value of the hyperbolic curve is selected to be 0.3712*0.95=0.3526.

In addition, due to the close distance of the bridgehead, the deceleration distance is only 100 meters. According to GIS, the physical characteristics of the bridgehead will cause the vibration of the vehicle to be:

$$\alpha_v = 0.5621 \cdot e^{0.0378 \cdot speed}$$

Substituting the above formula into the nonlinear programming, the optimal k and b values of the hyperbolic tangent function can be obtained, b=31.05 km/h, k=0.6762. Therefore, the automated vehicle will achieve the best comfort by reducing the speed to about 39 km/h by a hyperbolic tangent function of k=0.6762.

The invention claimed is:

1. A comfort-based self-driving planning method, the method comprising the following steps:
   a) establishing a prediction model between vibration type pavement condition and driving comfort, based on type of vehicles, including:
      a1) mounting three-axis acceleration sensors to particular positions of a vehicle with selected model;
      a2) driving the vehicle at different speeds on testing roads, respectively, to acquire data of vibration of three-axis acceleration via the three-axis acceleration sensors;
      a3) calculating integrated weighted root-mean-square acceleration RMSA as a comfort indicator for each testing road based on the data of vibration of three-axis acceleration; and
      a4) establishing a multivariate linear regression based on the comfort indicator, a driving speed and an international roughness index IRI value, wherein the comfort indicator is used as a dependent variable, and the driving speed and the international roughness index IRI value are used as independent variables;
   b) obtaining road conditions, including road IRI, road surface anti-sliding performance, and abnormal conditions;
   c) guiding the vehicle to travel based on the road conditions;
   d) determining a speed control strategy during an acceleration process, a deceleration process and a uniform process, to generate a comfort-based speed curve; and
   e) optimizing parameters of the comfort-based speed curve to ensure a comfort degree of a user;
      wherein the comfort-based speed curve in step d) is obtained by the following method:
         when the differences of road IRI between an ahead road section and a current position is less than 10%, and there is no abnormal condition, the comfort-based speed curve is of constant speed; and when the differences of the road IRI between the ahead road section and the current position is greater than or equal to 10%, no matter there is abnormal condition or not, or when the differences of road IRI between the ahead road section and the current position is less than 10%, and there is abnormal condition, the comfort-based speed curve is of hyperbolic tangent function, which includes two parameters, wherein speed difference value and stability coefficient, the speed difference value is the difference between a current speed and a speed corresponding to a target comfort degree.

2. The method according to claim 1, wherein the testing roads in step a2) should meet the following conditions:
   a21) the testing roads are straight-line segment of not less than 300 meters long; and
   a22) the road roughness of the testing roads is 1 m/km, 2 m/km, 3 m/km, 4 m/km, 5 m/km, 6 m/km respectively.

3. The method according to claim 1, wherein method to obtain the road conditions comprises:
   b1) obtaining the following road condition information: measured road distress, road condition, abnormal traffic information, and road surface anti-sliding performance;
   b2) assigning GPS tags to the road conditions;
   b3) assigning the road condition information to GIS layers through GPS tags;
   b4) passing the road condition information to automated vehicles via vehicle road communication technology;
   b5) detecting vibrations by the automated vehicles using in-car sensors;
   b6) uploading the vibrations to GIS database via the vehicle road communication technology; and
   b7) analyzing the vibrations, updating and correcting the road condition information in the GIS database.

4. The method according to claim 3, wherein obtaining the road surface anti-sliding performance in b1) through the following sub-steps:
   b11) obtaining photos of front road by cameras on the automated vehicles;
   b12) converting each photo into a local binary pattern (LBP) matrix form;
   b13) drawing a histogram after calculating LBP values of all elements in each photo, and calculating LBP histogram fitting parameters, based on a mixed Gaussian distribution model; and
   b14) obtaining the road surface anti-sliding performance.

5. The method according to claim 3, wherein the step in b4) includes the following sub-steps:
   b41) arranging wireless transmission facilities along roadside at a first distance of 1 km;
   b42) the wireless transmission facilities including a data storage part and a short-range wireless communication part; wherein the data storage part stores the road condition information with the GPS tags; and
   b43) connecting automatically the wireless communication facilities to the automated vehicles, and passing the road condition information to the automated vehicles, when the automated vehicles travel within a range of wireless network coverage of roadside wireless communication facilities.

6. The method according to claim 3, wherein step b7 comprises two conditions:
   b71) recording a position of a vibration as a temporary data to be confirmed when the vibration beyond expectation is detected, and adding the data to the GIS database when position matching degree is greater than 2.1; and
   b72) recording a position of a vibration as a temporary data to be deleted when the vibration within expectation is not detected, and deleting the data from the GIS database when position matching degree is greater than 2.1.

7. The method according to claim 1, wherein when the differences of road IRI between the ahead road section and the current position is greater than 10%, but there is no abnormal condition, the stability coefficient is calculated as follows:
   e11) calculating maximum acceleration of a driving direction;
   e12) calculating the comfort degree under the current speed, based on the prediction model; and
   e13) calculating an weighted RMSA of the maximum acceleration and the comfort degree, so that the comfort degree is less than a comfort degree thresholds; calculating a value range of the stability coefficient and choosing the maximum of the value range as a value of the stability coefficient.

8. The method according to claim 2, wherein the differences of road IRI between the ahead road section and the current position is greater than 10%, but there is no abnormal condition, the stability coefficient is calculated as follows:
   e11) calculating maximum acceleration of a driving direction;
   e12) calculating the comfort degree under current speed, based on the prediction model; and
   e13) calculating the weighted RMSA of the maximum acceleration and the comfort degree, so that the comfort degree is less than a comfort degree threshold; calculating a value range of the stability coefficient; and choosing the maximum of the value range as a value of the stability coefficient.

9. The method according to claim 3, wherein the differences of road IRI between the ahead road section and the current position is greater than 10%, but there is no abnormal condition, the stability coefficient is calculated as follows:
   e11) calculating maximum acceleration of a driving direction;
   e12) calculating the comfort degree under current speed, based on the prediction model; and
   e13) calculating the weighted RMSA of the maximum acceleration and the comfort degree, so that the comfort degree is less than a comfort degree threshold; calculating a value range of the stability coefficient; and choosing the maximum of the value range as a value of the stability coefficient.

10. The method according to claim 1, wherein the differences of road IRI between the ahead road section and the current position is less than 10%, but there is abnormal condition, the stability coefficient is calculated as follows:
    e21) calculating an acceleration jerk, ensuring the acceleration jerk is within an acceleration jerk threshold; calculating a first value range of a first stability coefficient;
    e22) calculating maximum acceleration of a driving direction; establishing a nonlinear optimization equation, based on the prediction model and a second distance between an automated vehicle and a nearest abnormal condition, and calculating a second value range of a second stability coefficient; and e23) comparing the two value ranges of the first and second stability coefficient in e21) and e22), and choosing the maximum of the two value ranges as a value of the stability coefficient.

11. The method according to claim 2, wherein the differences of road IRI between the ahead road section and the current position is less than 10%, but there is abnormal condition, the stability coefficient is calculated as follows:
   e21) calculating an acceleration jerk, ensuring the acceleration jerk is within an acceleration jerk threshold; calculating a first value range of a first stability coefficient;
   e22) calculating maximum acceleration of a driving direction; establishing a nonlinear optimization equation, based on the prediction model and a second distance between an automated vehicle and a nearest abnormal condition, and calculating a second value range of a second stability coefficient; and
   e23) comparing the two value ranges of the first and second stability coefficient in e21) and e22), and choosing the maximum of the two value ranges as a value of the stability coefficient.

12. The method according to claim 3, wherein the differences of road IRI between the ahead road section and the current position is less than 10%, but there is abnormal condition, the stability coefficient is calculated as follows:
   e21) calculating an acceleration jerk, ensuring the acceleration jerk is within an acceleration jerk threshold; calculating a first value range of a first stability coefficient;
   e22) calculating maximum acceleration of a driving direction; establishing a nonlinear optimization equation, based on the prediction model and a second distance between an automated vehicle and a nearest abnormal condition, and calculating a second value range of a second stability coefficient; and
   e23) comparing the two value ranges of the first and second stability coefficient in e21) and e22), and choosing the maximum of the two value ranges as a value of the stability coefficient.

13. The method according to claim 1, wherein the differences of road IRI between the ahead road section and the current position is greater than 10%, and there is abnormal condition, the stability coefficient is calculated as follows:
   e31) calculating maximum acceleration, calculating the comfort degree under a current speed, based on the prediction model, calculating weighted root-mean-square of the maximum acceleration and the comfort degree, so that the comfort degree is less than a comfort degree threshold; calculating a first value range of a first stability coefficient, and taking the maximum of the first value range as a value of the first stability coefficient;
   e32) calculating an acceleration jerk, ensuring the acceleration jerk is less than an acceleration jerk threshold; calculating a second value range of a second stability coefficient, and taking the maximum of the second value range as a value of the second stability coefficient;
   e33) calculating the maximum acceleration; establishing a nonlinear optimization equation, based on the prediction model and a second distance between an automated vehicle and a nearest abnormal condition; and calculating a third value range of a third stability coefficient, and taking the maximum of the third value range as a value of the third stability coefficient; and
   e34) choosing the maximum of the first stability coefficient, second stability coefficient, and third stability coefficient in e31), e32), and e33) as a value of the stability coefficient.

14. The method according to claim 2, wherein the differences of road IRI between the ahead road section and the current position is greater than 10%, and there is abnormal condition, the stability coefficient is calculated as follows:
   e31) calculating maximum acceleration, calculating the comfort degree under a current speed, based on the prediction model, calculating weighted root-mean-square of the maximum acceleration and the comfort degree, so that the comfort degree is less than a comfort degree threshold; calculating a first value range of a first stability coefficient, and taking the maximum of the first value range as a value of the first stability coefficient;
   e32) calculating an acceleration jerk, ensuring the acceleration jerk is less than an acceleration jerk threshold; calculating a second value range of a second stability coefficient, and taking the maximum of the second value range as a value of the second stability coefficient;
   e33) calculating the maximum acceleration; establishing a nonlinear optimization equation, based on the prediction model and a second distance between an automated vehicle and a nearest abnormal condition; and calculating a third value range of a third stability coefficient, and taking the maximum of the third value range as a value of the third stability coefficient; and
   e34) choosing the maximum of the first stability coefficient, second stability coefficient, and third stability coefficient in e31), e32), and e33) as a value of the stability coefficient.

* * * * *